(12) United States Patent
Shigeta

(10) Patent No.: US 12,260,273 B2
(45) Date of Patent: *Mar. 25, 2025

(54) GAME TOKEN MONEY, METHOD OF MANUFACTURING GAME TOKEN MONEY, AND INSPECTION SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,419

(22) Filed: May 18, 2022

(65) Prior Publication Data

US 2022/0277178 A1  Sep. 1, 2022

Related U.S. Application Data

(63) Continuation of application No. 16/633,218, filed as application No. PCT/JP2018/026159 on Jul. 11, 2018, now Pat. No. 11,373,075.

(30) Foreign Application Priority Data

Jul. 26, 2017  (JP) ................. 2017-144920

(51) Int. Cl.
*G07F 17/32* (2006.01)
*G06K 19/04* (2006.01)
*G06K 19/07* (2006.01)

(52) U.S. Cl.
CPC ....... *G06K 19/047* (2013.01); *G06K 19/0723* (2013.01); *G07F 17/3223* (2013.01); *G07F 17/3241* (2013.01); *G07F 17/3248* (2013.01)

(58) Field of Classification Search
CPC ............. G07F 17/3223; G07F 17/3241; G07F 17/3248

(Continued)

(56) References Cited

U.S. PATENT DOCUMENTS 3,953,932 A    5/1976 Graves
3,968,582 A *  7/1976 Jones ................. A44C 21/00
                                              264/246

(Continued)

FOREIGN PATENT DOCUMENTS

CA    3035418 A1    2/2017
CA    3054665 A1    8/2018

(Continued)

OTHER PUBLICATIONS

International Search Report dated Oct. 9, 2018 issued in corresponding PCT application PCT/JP2018/026159.

(Continued)

*Primary Examiner* — Ryan Hsu
(74) *Attorney, Agent, or Firm* — NORTON ROSE FULBRIGHT US LLP

(57) ABSTRACT

A game token money includes a plurality of plastic layers laminated through thermocompression bonding including at least a colored layer in the middle to specify a value of the game token money and a pair of pale color layers laminated on both sides of the colored layer. An RFID is embedded in a layer other than the outermost layer of the plurality of plastic layers; and a classification part is filled in at least one of the pale color layers to indicate a classification of the game token money. The classification part is recognizable from a side face and a front face of the game token money. The RFID contains information regarding a value of the game token money and a classification of the game token money indicated by the classification part.

13 Claims, 30 Drawing Sheets

(58) Field of Classification Search
USPC .......................................................... 463/25
See application file for complete search history.

(56) References Cited

U.S. PATENT DOCUMENTS

| | | | |
|---|---|---|---|
| 5,361,885 A | 11/1994 | Modler | |
| 5,673,503 A | 10/1997 | Rendleman | |
| 5,676,376 A | 10/1997 | Valley | |
| 6,021,949 A | 2/2000 | Boiron | |
| 6,186,895 B1 | 2/2001 | Oliver | |
| 6,200,218 B1 | 3/2001 | Lindsay | |
| 6,254,002 B1 | 7/2001 | Litman | |
| 6,508,466 B1 | 1/2003 | Rendleman | |
| 6,532,297 B1 | 3/2003 | Lindquist | |
| 7,448,485 B1 | 11/2008 | Rutler | |
| 7,926,725 B2 | 4/2011 | Charlier et al. | |
| 10,691,989 B2 | 6/2020 | Shigeta | |
| 2003/0084596 A1 | 5/2003 | Zurawski et al. | |
| 2003/0174864 A1 | 9/2003 | Lindquist | |
| 2003/0195025 A1 | 10/2003 | Hill | |
| 2005/0059479 A1 | 3/2005 | Soltys et al. | |
| 2005/0208998 A1 | 9/2005 | Toyoda | |
| 2006/0019739 A1 | 1/2006 | Soltys et al. | |
| 2007/0105616 A1 | 5/2007 | Chapet et al. | |
| 2007/0184898 A1 | 8/2007 | Miller et al. | |
| 2008/0234052 A1 | 9/2008 | Steil | |
| 2009/0075725 A1 | 3/2009 | Koyama | |
| 2010/0093429 A1 | 4/2010 | Mattice et al. | |
| 2010/0130288 A1 | 5/2010 | Shigeta | |
| 2010/0210355 A1 | 8/2010 | Koyama et al. | |
| 2010/0227674 A1 | 9/2010 | Neo et al. | |
| 2010/0240446 A1 | 9/2010 | Koyama et al. | |
| 2011/0028204 A1 | 2/2011 | Schwartz | |
| 2011/0052049 A1 | 3/2011 | Rajaraman et al. | |
| 2012/0080841 A1 | 4/2012 | Chapet et al. | |
| 2012/0080845 A1 | 4/2012 | Emori et al. | |
| 2014/0332595 A1 | 11/2014 | Moreno et al. | |
| 2018/0070687 A1 | 3/2018 | Shigeta | |

FOREIGN PATENT DOCUMENTS

| | | |
|---|---|---|
| CN | 1954346 A | 4/2007 |
| CN | 102368926 A | 3/2012 |
| CN | 105705056 A | 6/2016 |
| JP | 2005261766 A | 9/2005 |
| JP | 2006238899 A | 9/2006 |
| JP | 2009066172 A | 4/2009 |
| JP | 2016520386 A | 7/2016 |
| WO | 2008039835 A2 | 4/2008 |
| WO | 2008123452 A1 | 10/2008 |
| WO | 2014182306 A1 | 11/2014 |
| WO | 2016187164 A1 | 11/2016 |
| WO | 2017022767 A1 | 2/2017 |
| WO | 2017086413 A1 | 5/2017 |

OTHER PUBLICATIONS

Chinese Office Action dated Mar. 18, 2021 issued in Chinese Application 201880049681.7.
US Office Action dated Mar. 23, 2021 issued in U.S. Appl. No. 16/872,424.
European Search Report dated May 21, 2021 issued in EP Application 18838077.8.
US Offidce Action dated Feb. 18, 2022 issued in U.S. Appl. No. 16/872,424.
Japanese Notice of Allowance dated Jul. 5, 2022 issued in JP Application 2020-110719.
US Office Action dated Sep. 20, 2024 issued in U.S. Appl. No. 18/371,724.

* cited by examiner

GAME TOKEN MONEY, METHOD OF MANUFACTURING GAME TOKEN MONEY, AND INSPECTION SYSTEM

CROSS REFERENCE TO RELATED APPLICATION

This application is a continuation of U.S. patent application Ser. No. 16/633,218 filed Jan. 23, 2020, is a national phase application under 35 U.S.C. § 371 of International Application No. PCT/JP2018/026159 filed Jul. 11, 2018, which claims priority to JP Pat. App. No. 2017-144920 filed Jul. 26, 2017, the entire contents of each disclosure are hereby incorporated by reference.

FIELD

The present invention relates to a game token money used in a game of a gambling house, a method of manufacturing the game token money, and an inspection system of the game token money.

BACKGROUND AND SUMMARY

In the related art, there is known a game token money having a plurality of filler portions provided in a peripheral edge and spaced with intervals along a circumferential direction. FIG. 19 is a perspective view illustrating a game token money of the related art. In the game token money 190, the filler portion 191 is formed of a material having a color different from the colors of other portions. Therefore, the filler portion can be recognized on the front face and the side face of the game token money.

The game token money of the related art is manufactured through injection molding, and a material having a color different from those of other portions is injected to the filler portions. As a result, a game token money in which the color on the side face is changed between the filler portions 191 and other portions along the circumferential direction is obtained.

The applicant proposed a method of manufacturing a game token money having a multilayered structure by overlapping a plurality of sheet-shaped members, thermocompressively bonding the sheet-shaped members to form a multilayered lamination plate, and punching the multilayered lamination plate (for example, PCT/JP 2016/072673). In such a multilayered lamination plate, by coloring a plurality of sheet-shaped members with different colors, it is possible to recognize a plurality of layers having different colors on the side face of the game token money obtained through punching.

An object of the invention is to provide a game token money having a layered structure provided with filler portions recognizable on the front face and the side face, and a method of manufacturing the game token money.

According to an aspect of the invention, there is provided a game token money including: a plurality of plastic layers laminated through thermocompression bonding to form a strip pattern in a layering direction on a side face of the game token money, the plurality of plastic layers including at least a colored layer in the middle to specify a value of the game token money and a pair of pale color layers laminated on both sides of the colored layer to interpose the colored layer; a radio-frequency identification (RFID) embedded in a layer other than the outermost layer of the plurality of plastic layers; and a classification part filled in at least one of the pale color layers to indicate a classification of the game token money, wherein the classification part is recognizable from a side face and a front face of the game token money, and the RFID contains information regarding a value of the game token money and a classification of the game token money indicated by the classification part. In this configuration, in the game token money having a layered structure obtained by laminating a plurality of plastic layers, it is possible to implement a filler portion visually recognizable from a front face and a side face.

In the game token money described above, the classification part may have a color different from a color of the colored layer.

In the game token money described above, the classification part may have a color similar to a color of the colored layer.

In the game token money described above, the classification part may have a plurality of different colors.

In the game token money described above, the classification part may indicate a classification of the game token money regarding whether the game token money is for a very important person (VIP) or for a common person.

In the game token money described above, the classification part may indicate a classification of the game token money regarding whether the game token money is for a cash chip, for a rolling chip, or for a promotion chip.

In the game token money described above, a plurality of the classification parts may be arranged at an equiangular interval in a circumferential direction of the game token money. In this configuration, it is possible to visually recognize the classification part on the side face regardless of the angle of the circumferential direction of the game token money.

According to another aspect of the invention, there is provided a method of manufacturing a game token money, including: providing a plurality of plastic layers including a colored layer and a pale color layer; forming a classification part insertion layer by filling a classification part indicating a classification of the game token money in the pale color layer; forming a multilayered lamination plate by arranging at least the colored layer in the middle, laminating the classification part insertion layer on both sides of the colored layer by interposing the colored layer, arranging an RFID between the plurality of plastic layers, and compressively bonding each layer through thermocompression bonding; and punching the multilayered lamination plate into individual game token moneys, wherein the multilayered lamination plate is punched in the punching such that a punching line for punching the multilayered lamination plate into game token moneys crosses the classification part, and the multilayered lamination plate is punched such that the classification part is recognizable from a side face and a front face of the game token money after the punching. In this configuration, the classification part is exposed on a cutting section in the event of the punching. Therefore, it is possible to visually recognize the classification part from the side face side as well as from the front face side of the game token money.

In the manufacturing method described above, in the forming the classification part insertion layer, a plurality of the classification parts may be filled at an equiangular interval in a circumferential direction of the game token money to be punched. In this configuration, it is possible to visually recognize the classification part on the side face regardless of the angle of the circumferential direction of the game token money.

The manufacturing method described above may further include creating a database for associating information of the RFID with a value of the game token money and a classification of the game token money indicated by the classification part. In this configuration, it is possible to specify the value information and the classification information of the game token money associated with the information of the RFID by referencing the database.

According to further another aspect of the invention, there is provided a game token money including: an indication for indicating a value of the game token money on a front face; at least a colored layer provided in the middle to form a stripe pattern in a layering direction on a side face, the value of the game token money being specified by the colored layer; and a classification part formed in a color different from a color of the colored layer and filled in a position recognizable from a side face and a front face, the classification part indicating a classification other than the value of the game token money. In this configuration, it is possible to recognize the classification part on any one of the side face and the front face and specify the classification of the game token money.

The game token money described above may further include an RFID embedded inside, wherein the RFID contains information regarding a value of the game token money and a classification of the game token money indicated by the classification part. In this configuration, it is possible to acquire information associated with the value and the classification by reading the RFID.

In the game token money described above, the colored layer and the classification part may be externally recognized by a camera, and a value and a classification of the game token money obtained from the camera may be inspected in combination with information obtained from the RFID. In this configuration, it is possible to inspect the game token money using a combination of the value and classification and the RFID.

In the game token money described above, a plurality of the classification parts may be arranged at an equiangular interval in a circumferential direction of the game token money. In this configuration, it is possible to visually recognize the classification part on the side face regardless of the angle of the circumferential direction of the game token money.

According to still another aspect of the invention, there is provided a game token money obtained by laminating a plurality of layers including a surface layer having a visually recognizable front face and a middle layer positioned inward of the surface layer, the game token money including: a notch formed in an outer edge of the surface layer; and a classification part filled in the notch to indicate a classification of the game token money, wherein the surface layer and the classification part are visually recognizable on the front face of the game token money, and the surface layer, the classification part, and the middle layer are visually recognizable on a side face of the game token money.

According to still further another aspect of the invention, there is provided a method of manufacturing a game token money, the method including: providing a surface layer having a sheet shape having a blank portion; forming a classification part insertion layer by filling a classification part in the blank portion; forming a multilayered lamination plate by performing thermocompression bonding for a plurality of layers including the classification part insertion layer and a sheet-shaped middle layer; and obtaining a game token money by punching the multilayered lamination plate such that a punching line crosses the classification part.

According to still further another aspect of the invention, there is provided an inspection system for inspecting the game token money described above, including: a camera configured to create a front face image by photographing a front face of the game token money; a camera configured to create a side face image by photographing a side face of the game token money; and an inspection device configured to specify a color of the classification part from the front face image and specify a color of the classification part from the side face image.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
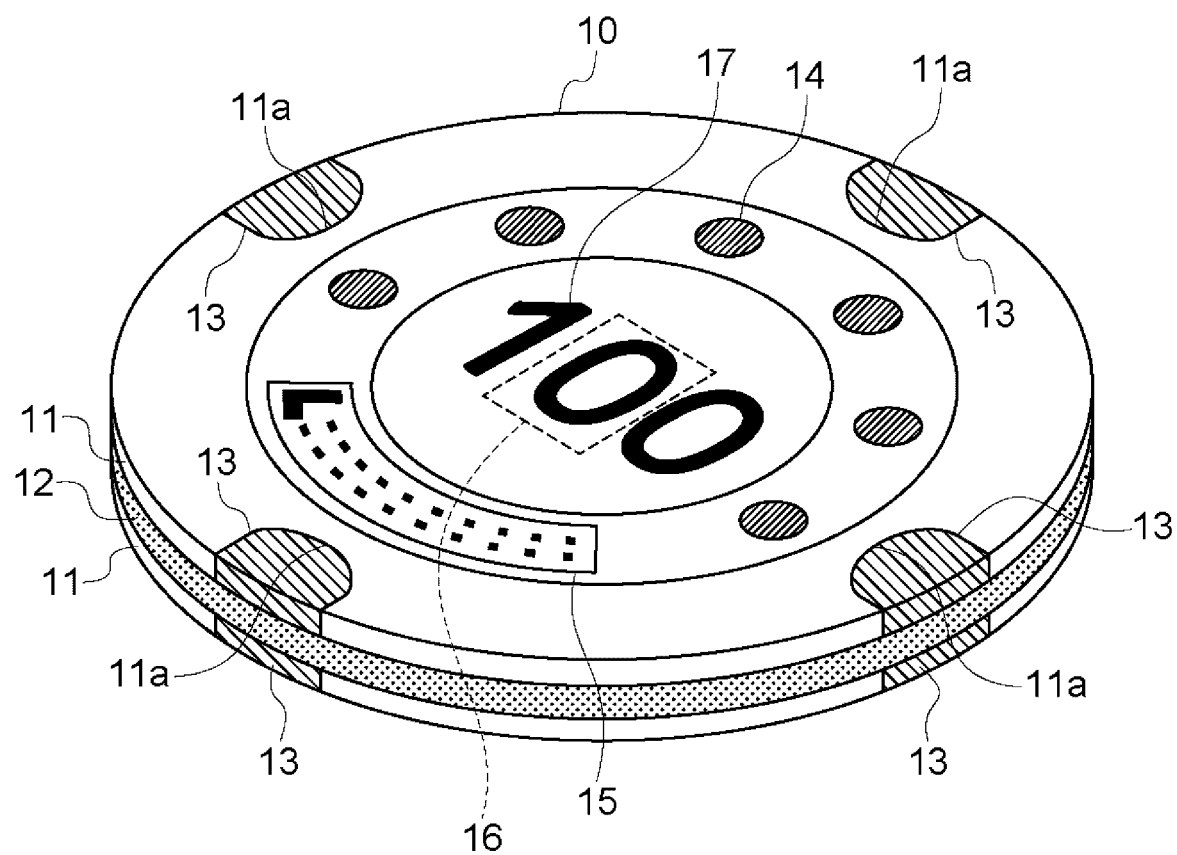
FIG. 1 is a perspective view illustrating a game token money according to an embodiment of the invention.

FIG. 1 is a perspective view illustrating a game token money according to an embodiment of the invention. The game token money 10 according to this embodiment is manufactured by laminating a plurality of plastic sheet-shaped members, performing thermocompression bonding, and then punching in a circular shape. For this purpose, as illustrated in FIG. 1, the game token money 10 has a layered structure obtained by laminating a plurality of layers in a thickness direction. The layered structure obtained by laminating a plurality of sheet-shaped members is exposed on a side face of the game token money 10 to form a stripe pattern in a layering direction.

The game token money 10 has a layered structure including a colored layer 12 as a middle layer and pale color layers 11 as surface layers on both sides by interposing the colored layer 12. The front face of the pale color layer 11 can be visually recognized from the outside. The color of the colored layer 12 corresponds to a value of the game token money 10 (such as twenty dollars, one hundred dollars, and one thousand dollars). That is, the game token money 10 has the colored layer 12 having a color different depending on its value. The pale color layer 11 has a color not denser than any color of the colored layer 12, and has a common color for a plurality of classifications of values. The pale color layer 11 typically has a white color. Therefore, the value of the game token money 10 can be specified by the color of the colored layer 12 by observing the side face.

Printing is performed on the front face of the pale color layer 11 as described below, and a transparent layer is provided thereon. Therefore, the printing on the front face of the pale color layer 11 can be visually recognized through the transparent layer. Notches 11a are provided on the outer edge of the pale color layer 11. Classification parts 13 are filled in the notches 11a of the pale color layer 11. A plurality of classification parts 13 are arranged at an equiangular interval in the circumferential direction (rotation direction) along the outer edge of the game token money 10. In the example of FIG. 1, four classification parts 13 are arranged at an angular interval of 90°.

Value information, identification information, and classification information are given to the game token money 10. Here, the value information is information indicating a value of the game token money 10 (such as ten dollars, twenty dollars, one hundred dollars, and one thousand dollars), and the identification information is unique information capable of identifying each game token money 10. The classification information is information indicating a classification of each game token money 10 other than the value. The classification information may include, for example, any one of information for distinguishing whether the game token money 10 is a rolling chip or a cash chip, junket information differently set for each junket to specify a junket, and casino information differently set for each casino to specify the casino.

The value information, the identification information, and the classification information can be visually recognized on the front face of the game token money 10. Specifically, the value information is written as numerals 17 on the front face of the game token money 10. The identification information is coded and written as marks 14 and 15 on the front face of the game token money 10. In addition, the classification parts 13 are colored depending on the classification, and the classification information is expressed by a color of the classification part 13. Note that the color of the classification part 13 is different from any color of the colored layer 12. Therefore, a classification of the game token money 10 can be specified by the color of the classification part 13.

The value information and the classification information can be visually recognized on the side face of the game token money 10. Specifically, the value information is expressed by the color of the colored layer 12 observed on the side face of the game token money 10. In addition, the classification part 13 indicating the classification information using the color can also be visually recognized on the side face.

The identification information is stored in a radio-frequency identification (RFID) chip 16 (hereinafter, simply referred to as an "RFID") embedded in the game token money 10. Therefore, by reading the game token money 10 using the RF reader, it is possible to read the identification information stored in the RFID 16.

In this manner, the value information and the identification information are given to the game token money 10 in a plurality of forms. However, a plurality of pieces of value information and identification information given to true game token moneys match each other. In addition, a relationship between the identification information, the value information, and the classification information is stored in a database. As the identification information is specified by the marks 14 and 15 or the RFID 16, the value information and the classification information corresponding to this identification information can be specified by referencing the database.

Figure 2:
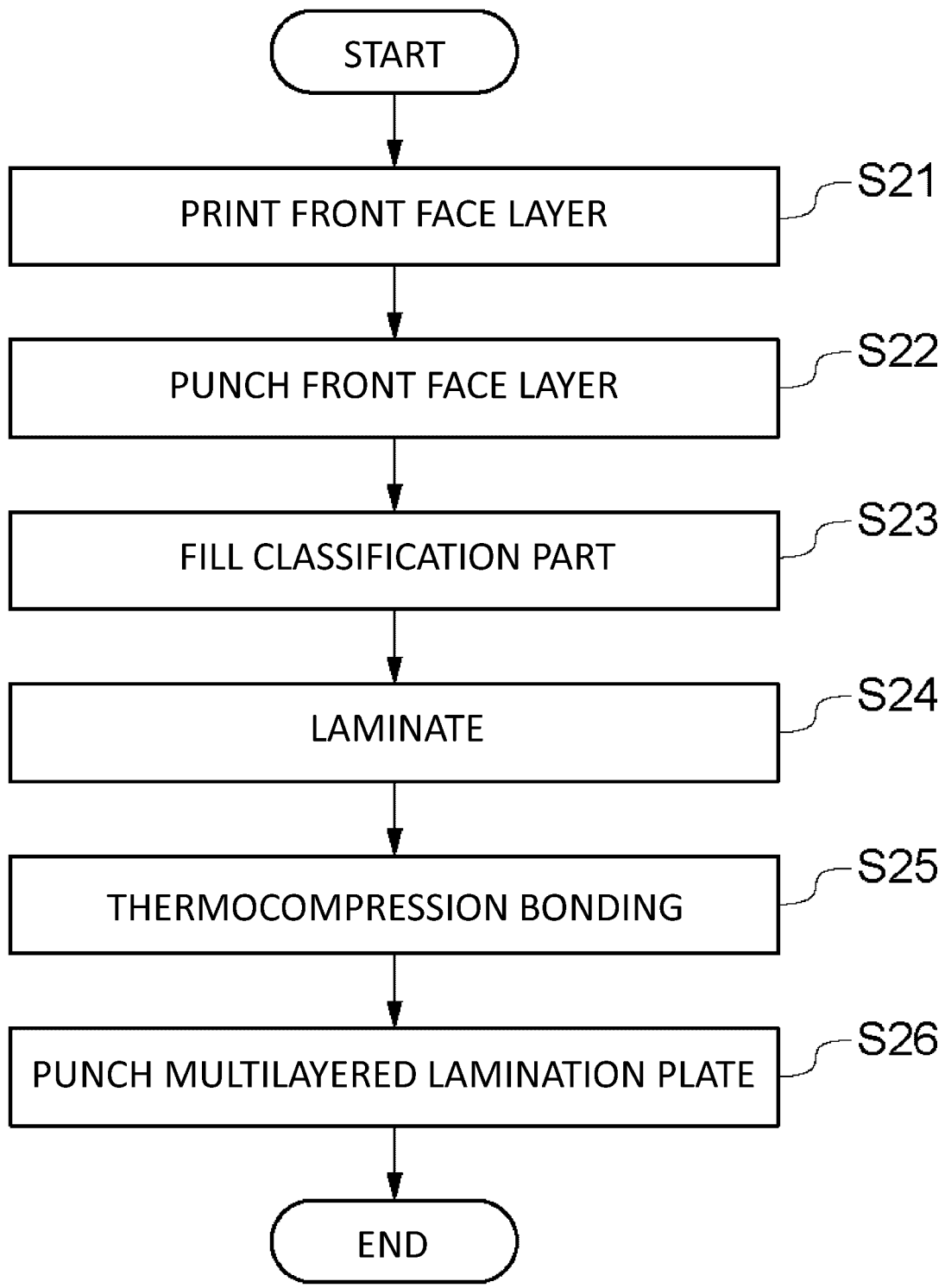
FIG. 2 is a flowchart illustrating a method of manufacturing a game token money according to an embodiment of the invention.

Next, a method of manufacturing the game token money 10 will be described. FIG. 2 is a flowchart illustrating the method of manufacturing the game token money 10. First, the numerals 17 indicating the value information, the marks 14 and 15, and other patterns are printed on the plastic sheet-shaped member 110 of the pale color layer 11 serving as a surface layer (step S21). As described below, the game token money 10 is manufactured by punching the sheet-shaped member, and a plurality of game token moneys 10 are obtained from a single sheet-shaped member. Accordingly, printing is performed to match the game token moneys 10 within a plurality of punching target ranges 111 of the sheet-shaped member 110 serving as the surface layer.

Figure 3:
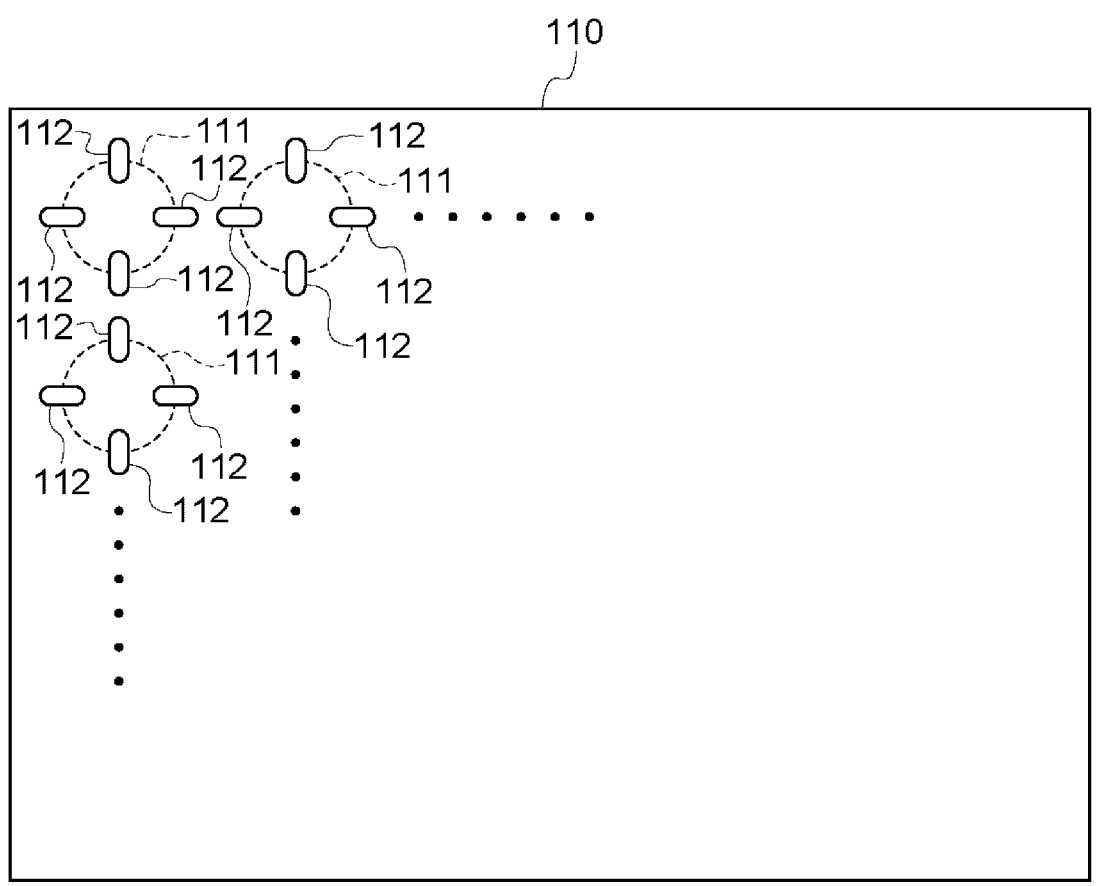
FIG. 3 is a top plan view illustrating a sheet-shaped member corresponding to a front face layer according to an embodiment of the invention.

Next, in order to form blank portions 112 for filling the classification part members 131 in the sheet-shaped member 110 of the surface layer, punching is performed to match shapes of the classification part members 131 (step S22). FIG. 3 is a top plan view illustrating the sheet-shaped member 110 serving as the surface layer. As illustrated in FIG. 3, a plurality of punching target ranges 111 are provided on the sheet-shaped member 110. Although not illustrated in FIG. 3, printing is performed to match the game token moneys 10 within the punching target ranges 111. The blank portions 112 are formed to intersect the outer edge of the punching target range 111 across the inside and the outside of each punching target range 111. According to this embodiment, as described above, the classification parts 13 are filled at an equiangular interval of 90°. Accordingly, four blank portions 112 are formed at an equiangular interval of 90° along the outer circumferential direction of the outer edge of the punching target range 111.

Figure 4:
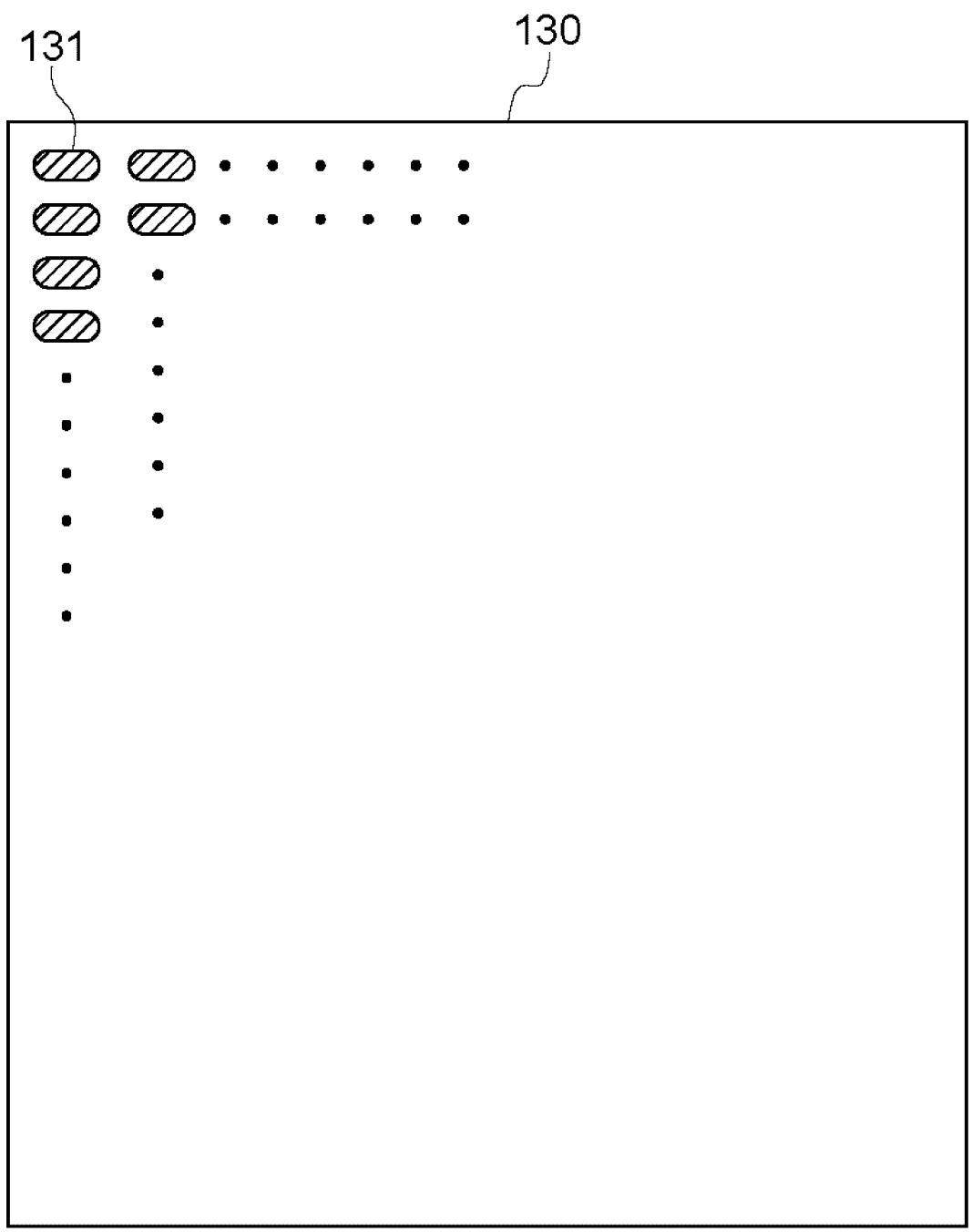
FIG. 4 is a top plan view illustrating a sheet-shaped member for fabricating classification part members according to an embodiment of the invention.

Meanwhile, the classification part member 131 filled in the blank portion 112 is also fabricated by punching the plastic sheet-shaped member 130. FIG. 4 is a top plan view illustrating the sheet-shaped member 130 for fabricating the classification part member 131. The sheet-shaped member 130 has the same thickness as that of the sheet-shaped member 110 serving as the surface layer and a color different from that of the sheet-shaped member 110. As illustrated in FIG. 4, the classification part members 131 shaped to match the blank portions 112 are punched out from the sheet-shaped member 130.

Figure 5:
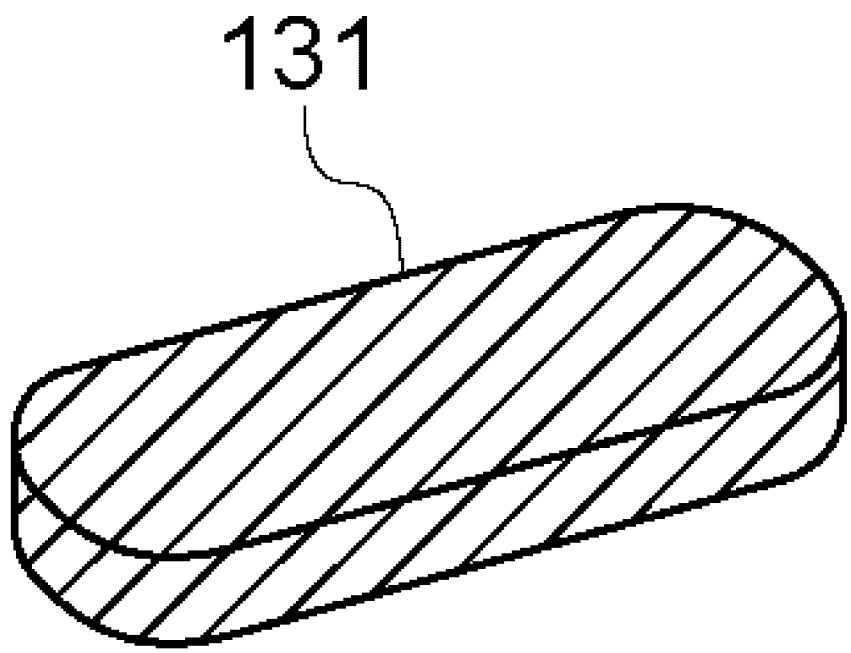
FIG. 5 is a perspective view illustrating a classification part member obtained from the sheet-shaped member according to an embodiment of the invention by punching.

FIG. 5 is a perspective view illustrating the classification part member 131 obtained by punching the sheet-shaped member 130. As illustrated in FIGS. 3 to 5, the blank portion 112 and the classification part member 131 filled in the blank portion 112 have a substantial rectangular shape with both longitudinal ends being rounded and are symmetric vertically and horizontally.

Figure 6:
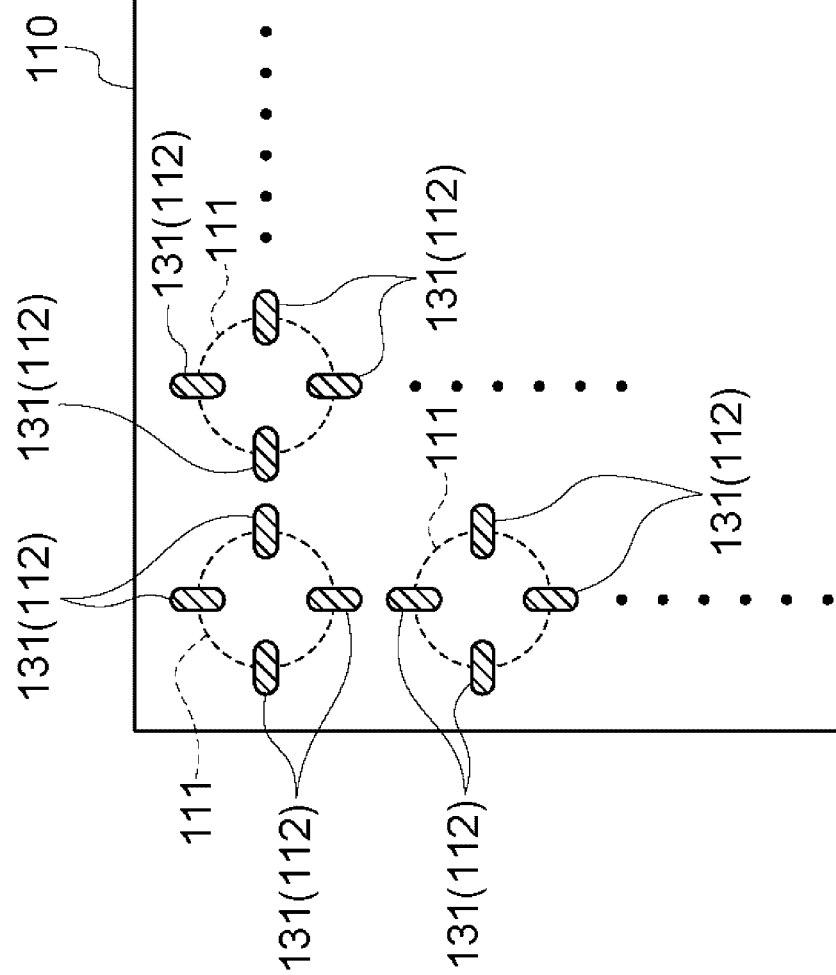
FIG. 6 is a top plan view illustrating a sheet-shaped member filled with the classification part members according to an embodiment of the invention.

Then, the classification part member 131 obtained by punching the sheet-shaped member 130 is filled in the blank portion 112 of the sheet-shaped member 110 serving as the surface layer (step S23). FIG. 6 is a top plan view illustrating the sheet-shaped member 110 filled with the classification part members 131. Note that the classification part members 131 are compressively bonded to the sheet-shaped member 110 and the sheet-shaped member 120 serving as the colored layer 12 in a thermocompression bonding process described below. Therefore, in this filling process, the classification part member 131 is not necessarily bonded to the sheet-shaped member 110.

Figure 7:
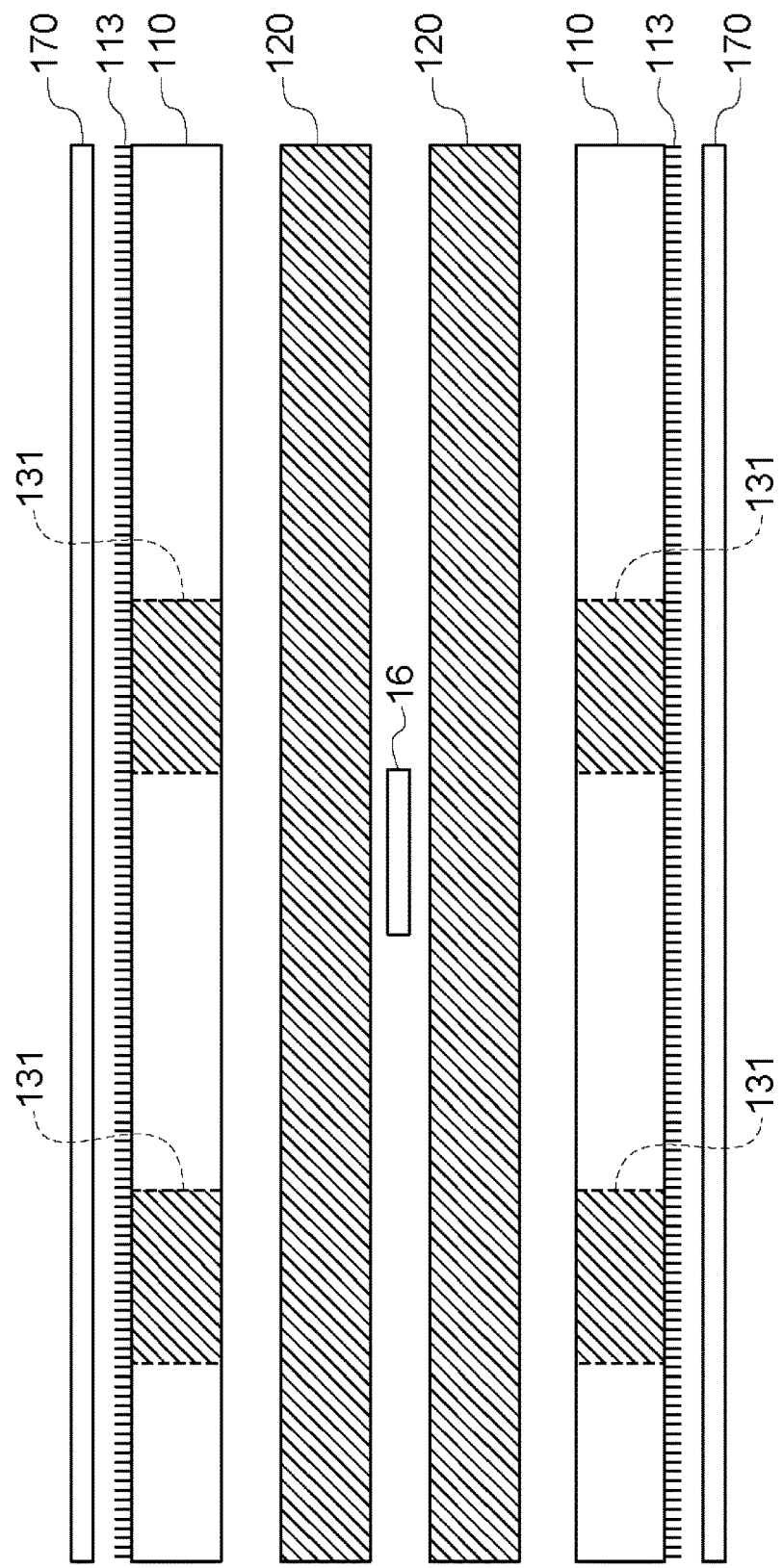
FIG. 7 is a diagram illustrating lamination of a plurality of sheet members according to an embodiment of the invention.

Then, a plurality of sheet-shaped members including the sheet-shaped members 110 and 120 filled with the aforementioned classification part members 131 are laminated (step S24). FIG. 7 is a diagram illustrating lamination of a plurality of sheet members. According to this embodiment, the colored layer 12 is formed by a pair of sheet members 120. The RFID 16 is arranged in the center of the punching target range 111 between a pair of sheet members 120 serving as the colored layers 12.

The sheet member 110 having the blank portion 112 filled with the classification part member 131 (classification part insertion layer) is laminated on both outer sides of a pair of sheet member 120 interposing the RFID 16 such that each print layer 113 faces the outside. In addition, a transparent layer 170 serving as a protection layer is laminated on the outside of each of a pair of classification part insertion layers. Note that, although each layer is spaced in FIG. 7, a plurality of layers are overlapped without a gap in the lamination process (step S24).

Thermocompression bonding is performed while a plurality of sheet members are laminated in this manner (step S25). Through this thermocompression bonding, the layers neighboring each other are compressively bonded to form a multilayered lamination plate 100 as a whole. The RFID 16 is embedded between a pair of sheet members 120 as the sheet member 120 is thermally deformed.

Figure 8:
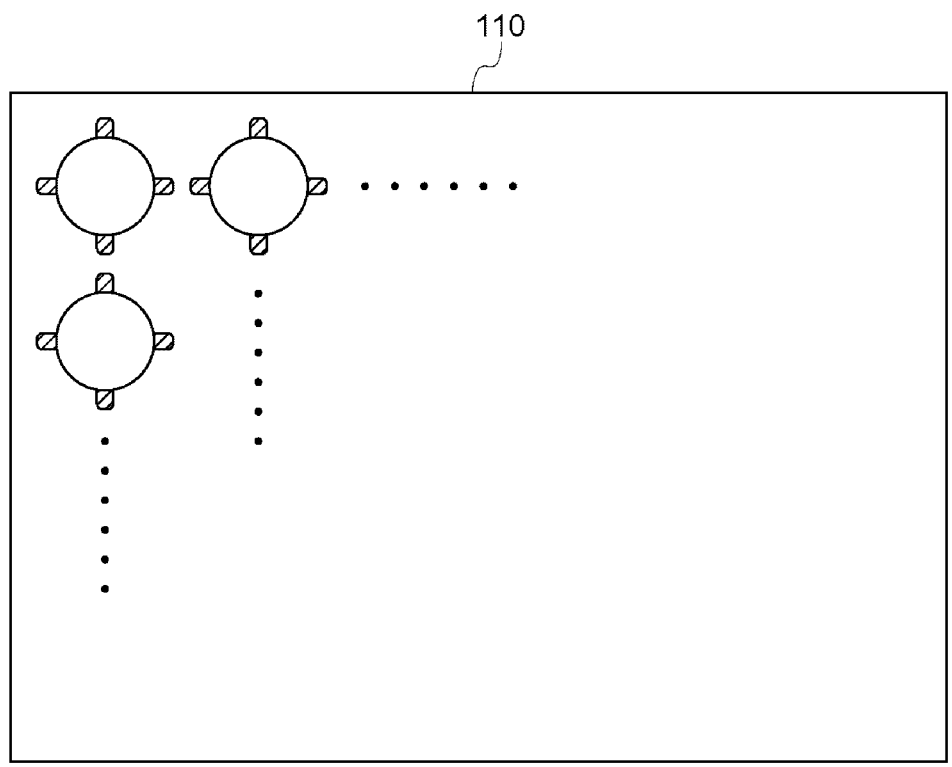
FIG. 8 is a top plan view illustrating a multilayered lamination plate subjected to punching and game token moneys obtained by punching according to an embodiment of the invention.
Figure 8:
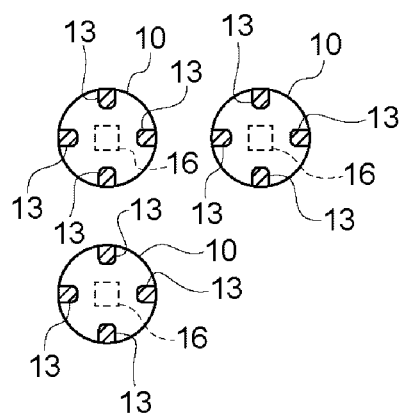

Then, the game token money 10 is punched out from the multilayered lamination plate 100 (step S26). FIG. 8 is a top plan view illustrating the multilayered lamination plate 100 subjected to the punching and the game token money 10 obtained by the punching. As described above, the classification part member 131 is arranged to intersect the outer edge of the punching target range 111 of each game token money 10. Therefore, the classification part member 131 is cut along the outer edge (punching line) of the punching target range 111 which crosses the classification part member 131.

As a result, the blank portion 112 forms a notch 11a, so that the game token money 10 illustrated in FIG. 1 is obtained as the cut classification part 13 is filled in the notch 11a. The cutting section of the classification part 13 is exposed on the side face of the pale color layer 11. Therefore, the classification part 13 can be visually recognized from both the front face side and the side face side. In this manner, the classification part 13 filled in the notch 11a formed in the outer edge of the pale color layer 11 serving as a surface layer makes a color change in the circumferential direction as the pale color layer 11 of the game token money 10 is observed from the side face.

Note that the printing on the surface layer may be performed after punching the game token money 10. In this case, a clear coating serving as a protection layer may be applied to the print layer subjected to the printing.

Figure 9:
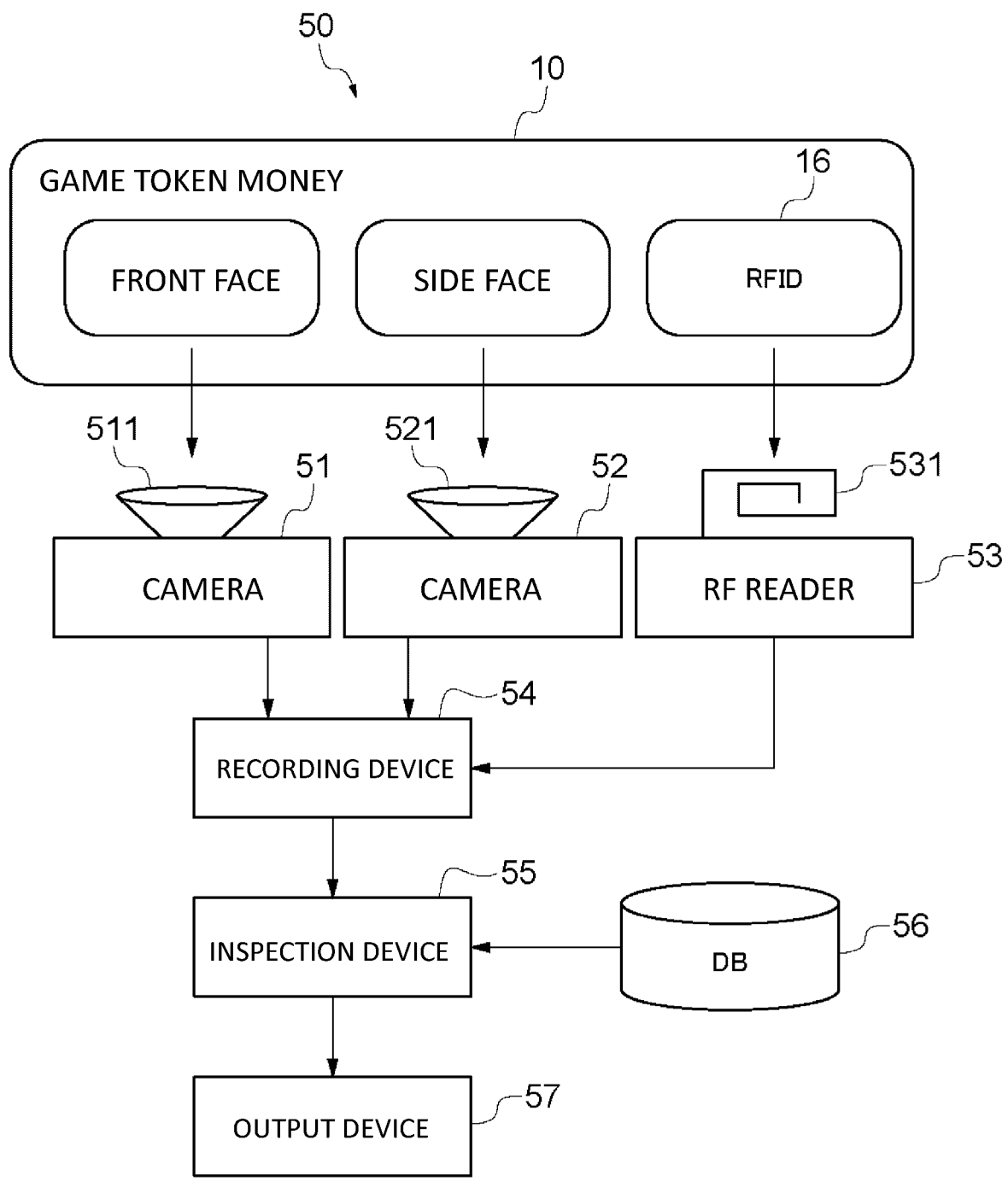
FIG. 9 is a block diagram illustrating a configuration of an inspection system according to an embodiment of the invention.

Next, an inspection system for inspecting the game token money 10 manufactured as described above will be described. FIG. 9 is a block diagram illustrating a configuration of the inspection system according to this embodiment. The inspection system 50 includes a game token money 10, cameras 51 and 52, and a RF reader 53.

Figure 10:
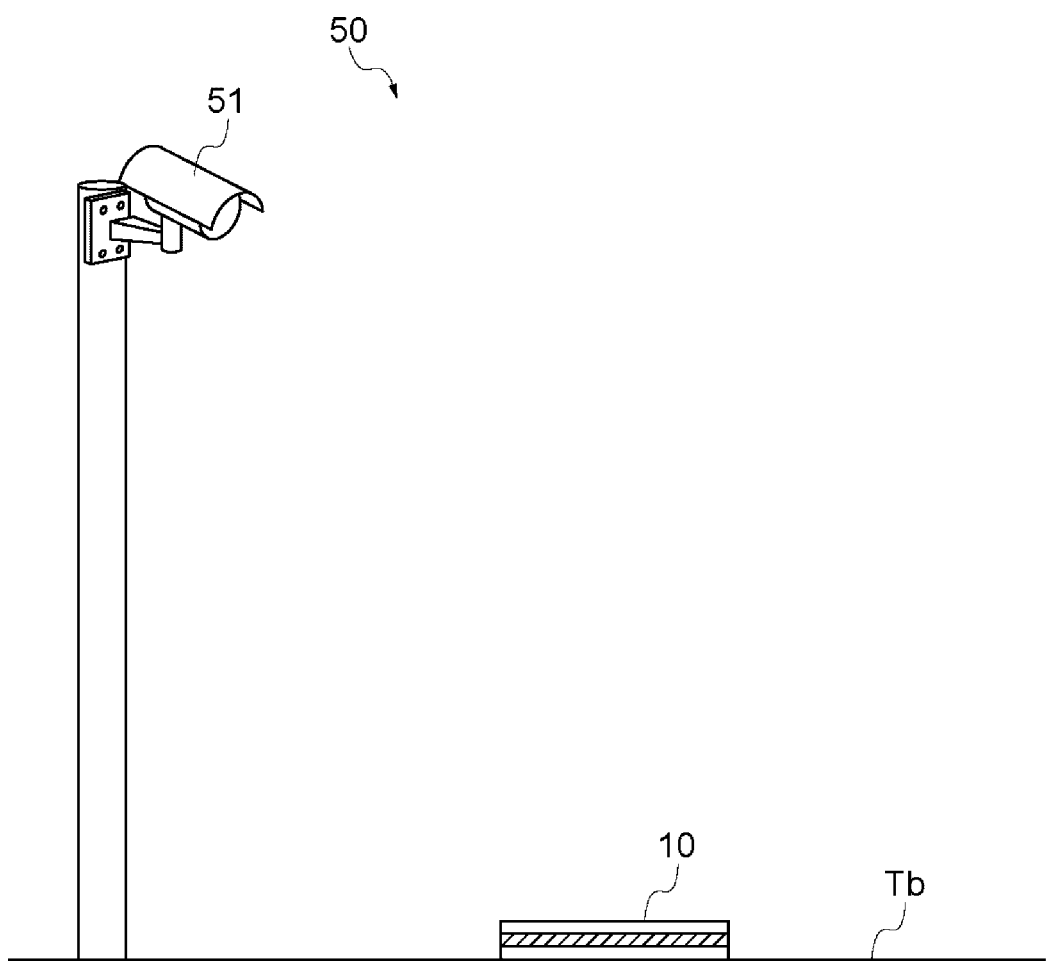
FIG. 10 is a diagram illustrating an installation example of a camera according to an embodiment of the invention.
Figure 11:
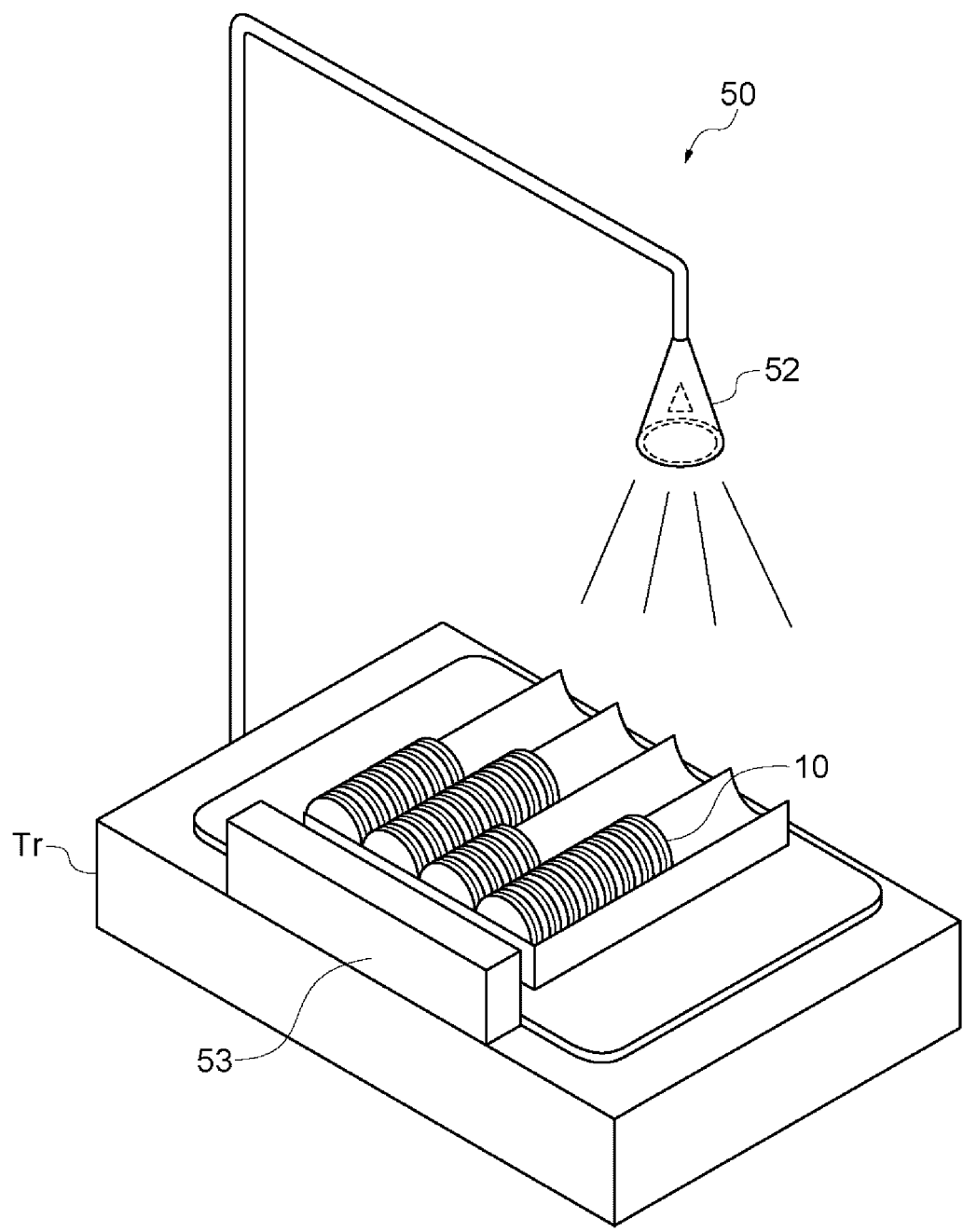
FIG. 11 is a diagram illustrating an installation example of a camera and an RF reader according to an embodiment of the invention.

FIG. 10 is a diagram illustrating an installation example of the camera 51. FIG. 11 is a diagram illustrating an installation example of the camera 52 and the RF reader 53. The camera 51 is installed over the table Tb as illustrated in FIG. 10. The camera 51 has an optical system 511 configured and arranged to photograph the front face of the game token money 10 placed on the table Tb. The camera 51 creates an image (front face image) by photographing the front face of the game token money 10 using the optical system 511.

As illustrated in FIG. 11, the camera 52 is installed over a chip tray Tr. The camera 52 has an optical system 521 configured and arranged to photograph the side face of the game token money 10. The camera 52 creates an image (side face image) by photographing the side face of the game token money 10 using the optical system 521. In addition, the RF reader 53 has an antenna 531 configured and arranged to transmit radio waves to the RFID 16 of the game token money 10 and receive the radio waves from the RFID 16. As illustrated in FIG. 11, the RF reader 53 reads information stored in the RFID 16 of the game token money 10 housed in the chip tray Tr using the antenna 531.

The inspection system 50 further includes a recording device 54, an inspection device 55, a database 56, and an output device 57. The recording device 54 records the front face image obtained from the camera 51, the side face image obtained from the camera 52, and the information read by the RF reader 53. The inspection device 55 performs inspection on the basis of the image or information recorded on the recording device 54.

As described above, the value information is expressed by writing numerals 17 in the center on the front face of the game token money 10, and the identification information is expressed by the marks 14 and 15. The classification information is expressed by the color of the classification part 13. The inspection device 55 recognizes each of the value information, the identification information, and the classification information by performing an image recognition processing for the front face image. Note that this image recognition processing may also be performed using a neural network.

The value information is expressed by the color of the middle layer (colored layer 12) on the side face of the game token money 10, and the classification information is expressed by the color of the classification part 13. The inspection device 55 recognizes each of the value information and the classification information by performing an image recognition processing for the side face image. In addition, this image recognition processing may also be performed using a neural network.

The database 56 stores the value information and the classification information in association with the identification information. The inspection device 55 specifies the value information and the classification information stored in association with the identification information by referencing the database 56 when the identification information is specified on the basis of the marks 14 and 15 from the front face image of the camera 51. The inspection device 55 compares the value information and the classification information specified in this manner with the value information and the classification information, respectively, specified on the basis of the numerals and the color of the classification part 13 from the front face image of the camera 51 and determines whether or not they match each other, that is, whether or not the game token money 10 is true or false. If they do not match each other, that is, if the game token money 10 is falsified, the output device 57 outputs a warning. The output device 57 may include a buzzer or a lamp for outputting the warning.

Meanwhile, the inspection device 55 specifies the value information and the classification information stored in association with the identification information by referencing the database 56 when the RF reader 53 reads the identification information stored in the RFID 16. The inspection device 55 compares the value information and the classification information specified in this manner with the value information and the classification information, respectively, specified on the basis of the color of the colored layer 12 and the color of the classification part 13 from the side face image of the camera 52 and determines whether or not they match each other, that is, whether or not the game token money 10 is true or false. If they do not match each other, that is, if the game token money 10 is falsified, the output device 57 outputs a warning.

As described above, according to this embodiment, a portion (classification part 13) visually recognizable from both the front face side and the side face side in a part of the circumferential direction is formed in the game token money 10 having the layered structure. For example, the classification information can be expressed using the color of this portion. Since this classification information can be visually recognized from both the front face side and the side face side, it is possible to recognize the classification information using both the camera that photographs the front face such as the camera 51 and the camera that photographs the side face such as the camera 52.

Figure 12:
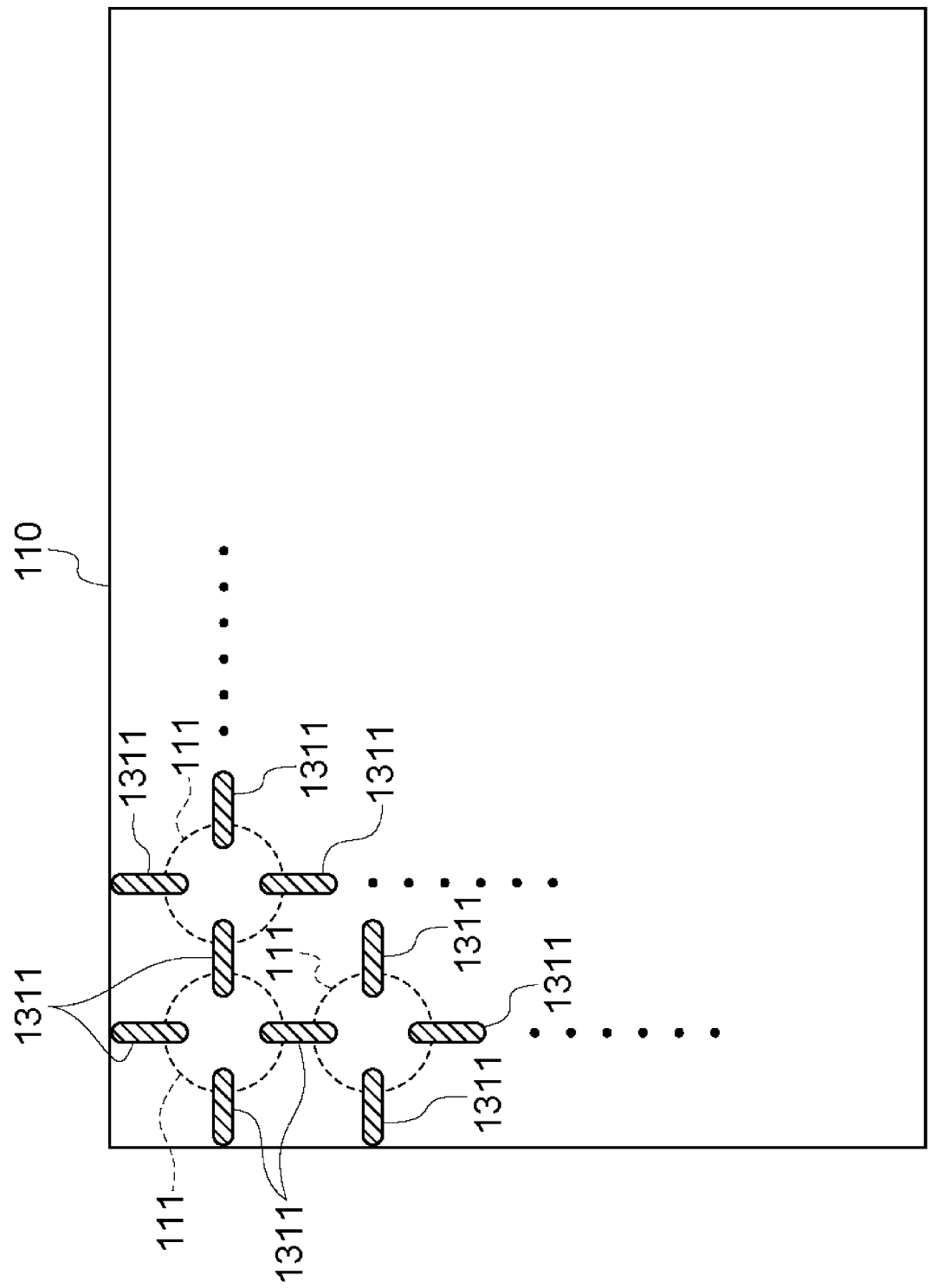
FIG. 12 is a top plan view illustrating a sheet-shaped member filled with classification part members according to a modification of the embodiment of the invention.

A method of manufacturing the game token money 10 according to a modification of the aforementioned embodiment will now be described. FIG. 12 is a top plan view illustrating the sheet-shaped member 110 filled with classification part members 1311 according to a modification of the embodiment in conjunction with FIG. 6. In this example, one classification part member 1311 is shared by the neighboring game token moneys 10. That is, one end portion of the classification part member 1311 corresponds to the classification part 13 of one game token money 10 by punching, and the other end portion corresponds to the classification part 13 of the game token money 10 neighboring to the one game token money 10 by punching. According to this modification, it is possible to reduce the number of the classification part members filled in the sheet-shaped member 110, which is advantageous in reduction of the manufacturing cost.

Figure 13:
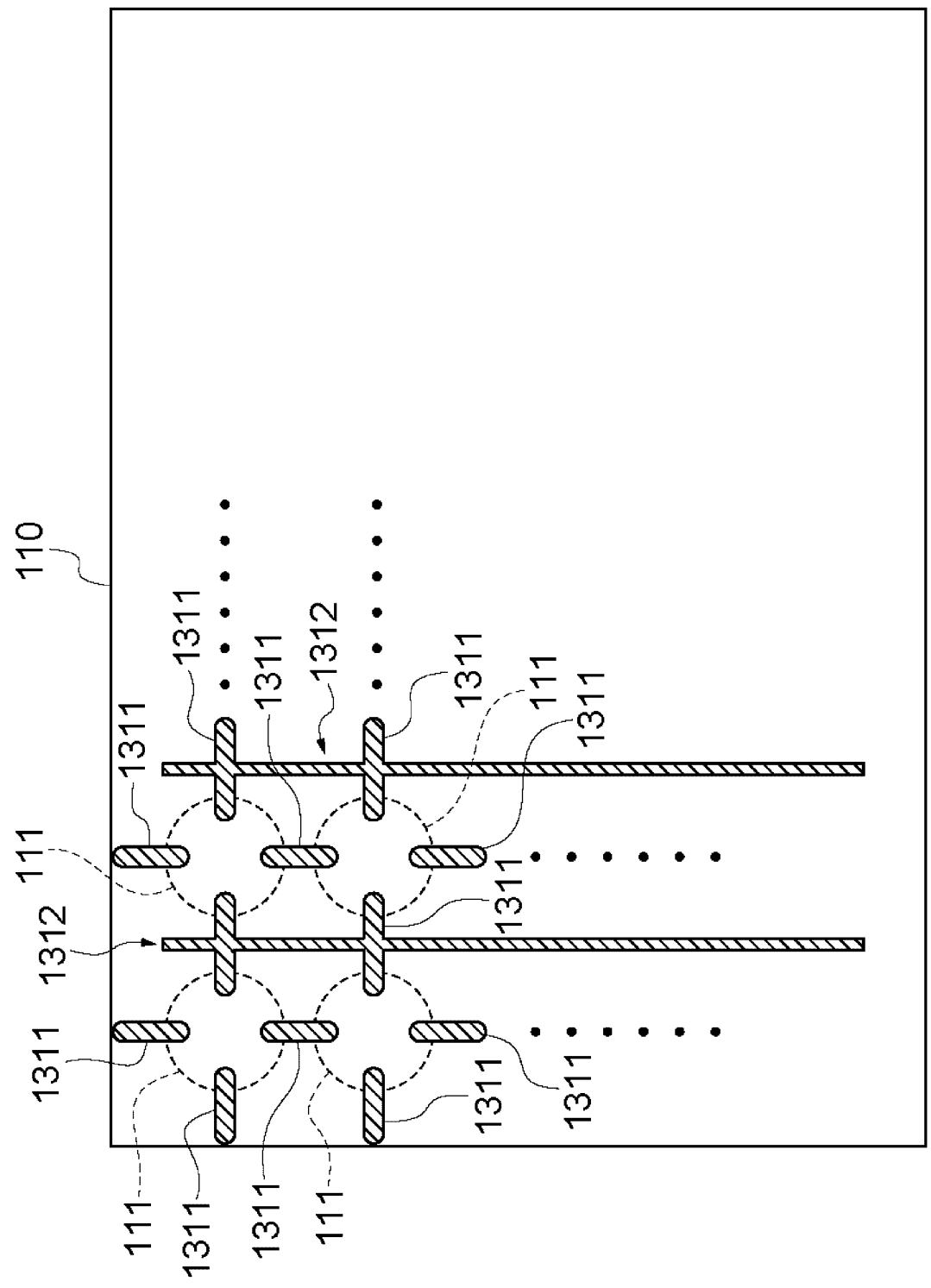
FIG. 13 is a top plan view illustrating a sheet-shaped member filled with classification part members according to a modification of the embodiment of the invention.
Figure 14:
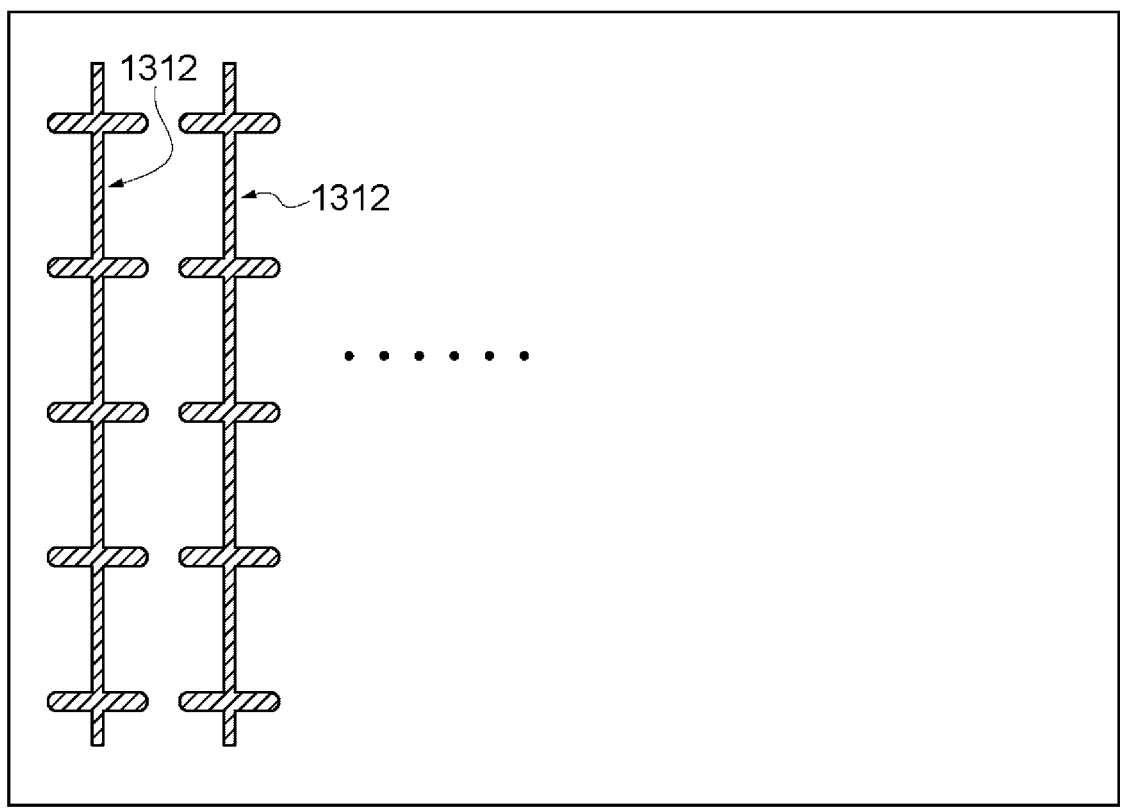
FIG. 14 is a top plan view illustrating a sheet-shaped member for fabricating classification parts according to a modification of the embodiment of the invention.
Figure 15:
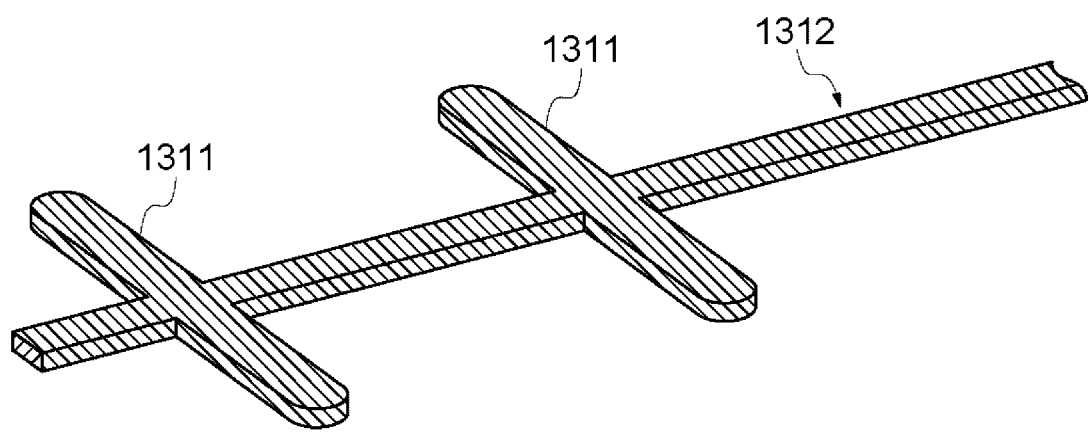
FIG. 15 is a perspective view illustrating a classification part member obtained by punching the sheet-shaped member according to the modification of the embodiment of the invention.

FIG. 13 is a top plan view illustrating the sheet-shaped member 110 filled with classification part members 1312 according to a modification of the embodiment in conjunction with FIG. 6. In this example, a single classification part member 1312 is formed by connecting the classification part members 1311 arranged in a vertical direction to each other. FIG. 14 is a top plan view illustrating a sheet-shaped member 130 for fabricating classification part members 1312 in conjunction with FIG. 4. FIG. 15 is a perspective view illustrating classification part members 1312 obtained by punching the sheet-shaped member 130. In this manner, by connecting a plurality of classification part members 1311, it is possible to reduce the number of the classification part members filled in the sheet-shaped member 110, which is advantageous in reduction of the manufacturing cost.

Figure 16:
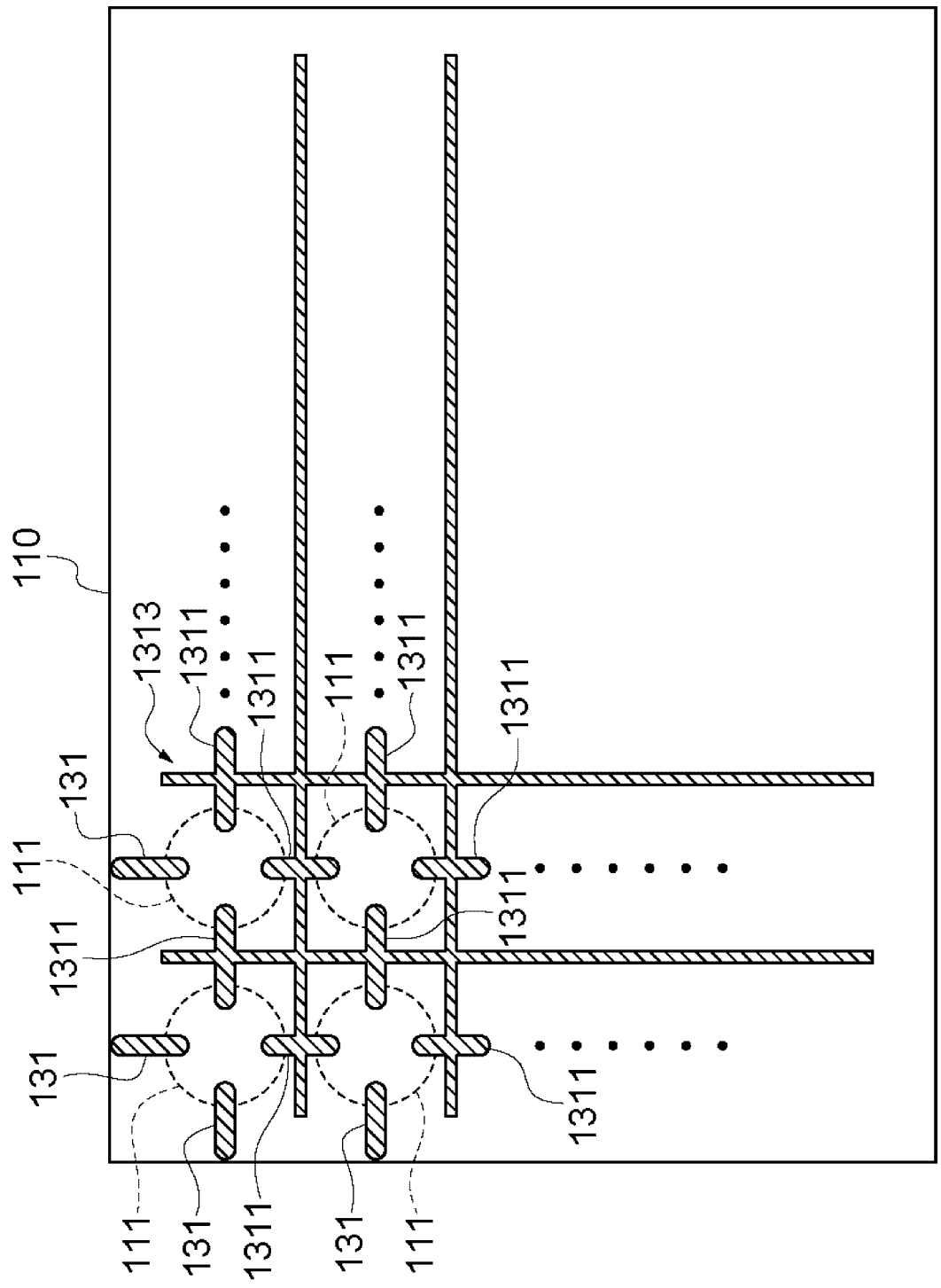
FIG. 16 is a top plan view illustrating a sheet-shaped member filled with the classification part member according to a modification of the embodiment of the invention.

FIG. 16 is a top plan view illustrating the sheet-shaped member 110 filled with a classification part member 1313 according to a modification of the modification in conjunction with FIG. 6. In this example, a single classification part member 1313 is formed by connecting the classification part members 1311 arranged in the vertical direction and the horizontal direction to each other. That is, the classification part member 1313 is formed by connecting all of the classification part members 1311 excluding the classification part member 131 filled in the peripheral portion of the sheet-shaped member 110. In this example, it is possible to further reduce the number of the classification part members, which is advantageous in reduction of the manufacturing cost.

Figure 17:
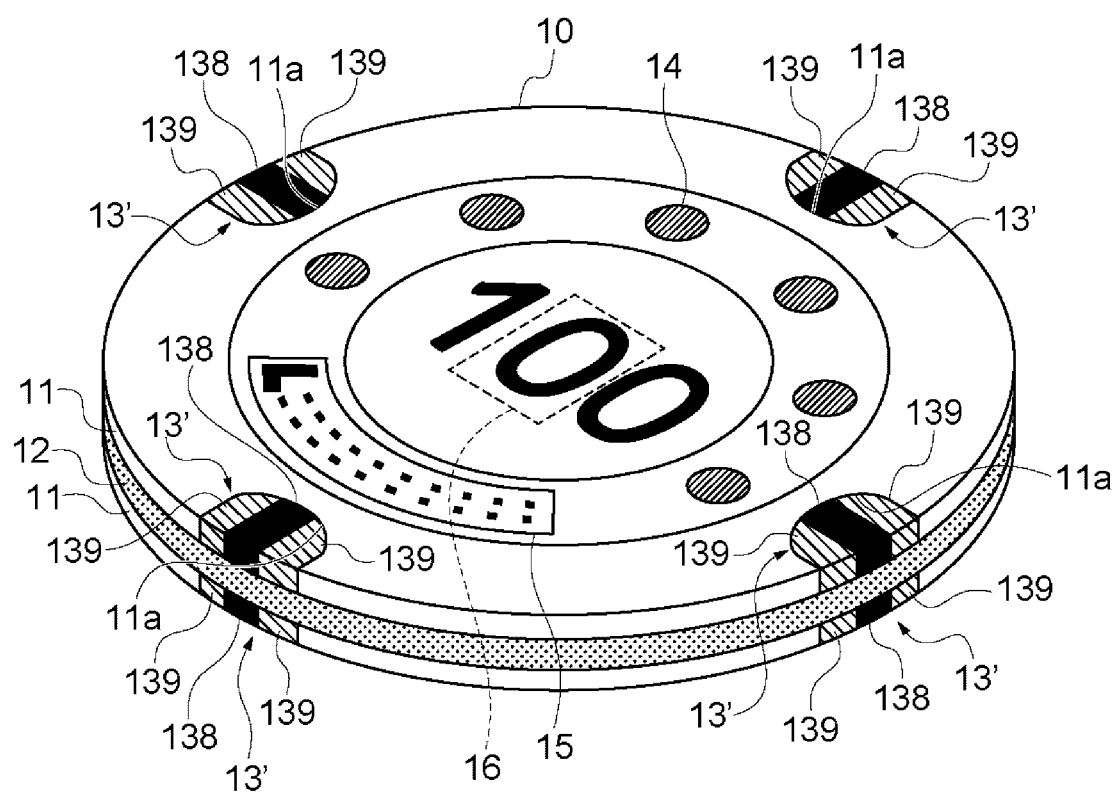
FIG. 17 is a perspective view illustrating a game token money filled with classification parts according to a modification of the embodiment of the invention.

Next, a modification of the classification part will be described. FIG. 17 is a perspective view illustrating the game token money 10 filled with the classification parts 13' according to a modification. The classification part 13' includes a center part 138 and side parts 139 interposing the center part 138. In this classification part 13' according to this modification, two types of information can be expressed by differently setting the color of the center part 138 and the color of the side parts 139. For example, one type of classification information (for example, casino information) can be expressed by the color of the center part 138, and the other type of the classification information (for example, junket information) can be expressed by the color of the side parts 139.

Figure 18:
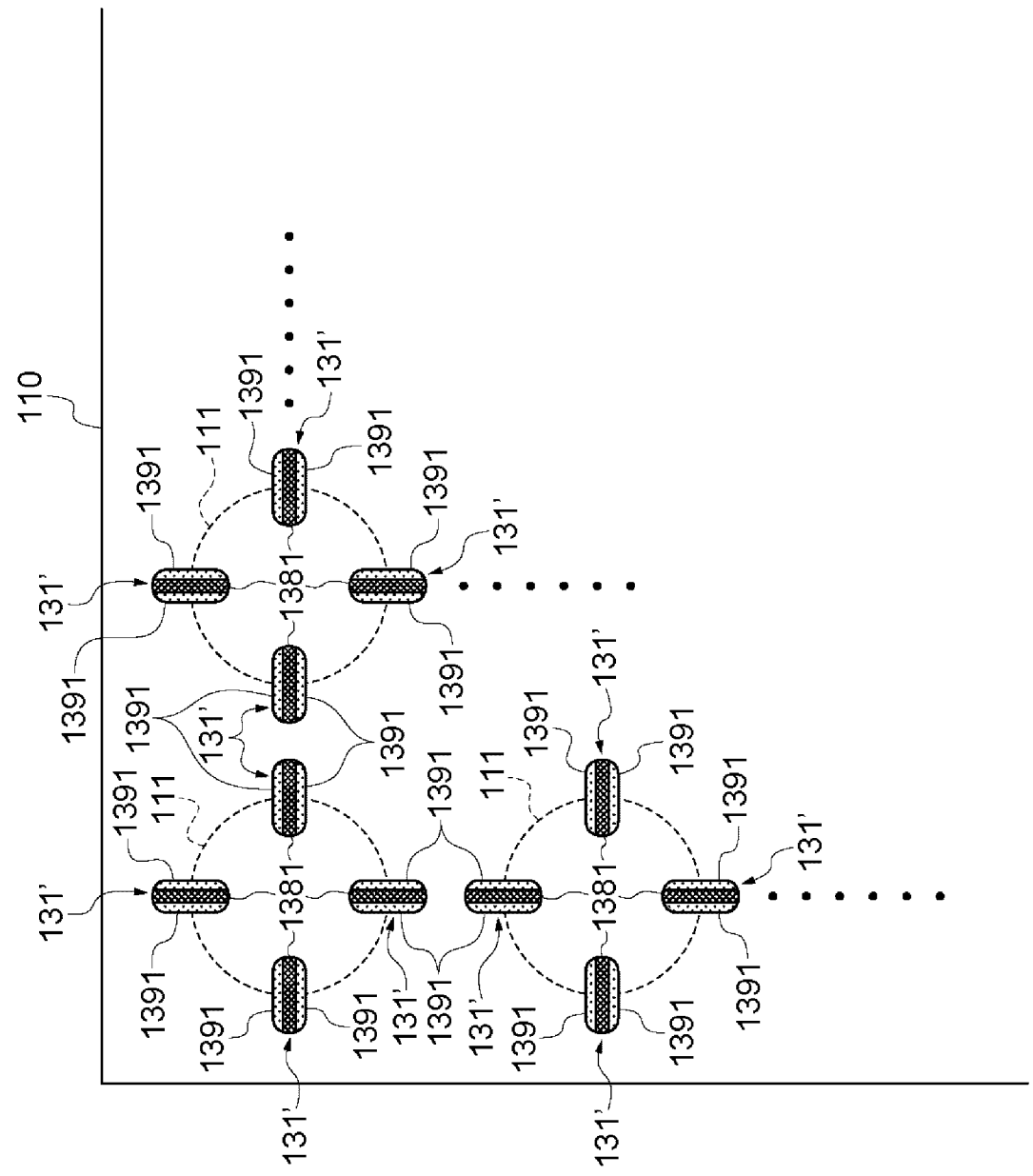
FIG. 18 is a top plan view illustrating a sheet-shaped member filled with classification part members according to a modification of the embodiment of the invention.
Figure 19:
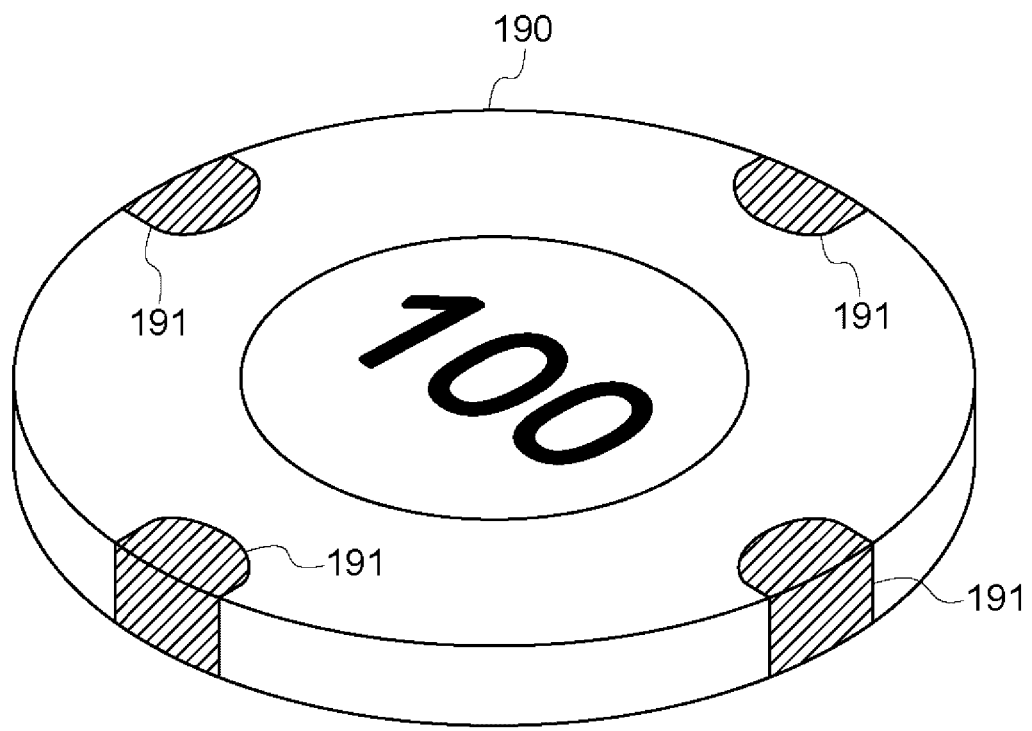
FIG. 19 is a perspective view illustrating a game token money of the related art.

FIG. 18 is a top plan view illustrating the sheet-shaped member 110 filled with classification part members 131' in conjunction with FIG. 6. One center part member 1381 and two side part members 1391 are filled in each blank portion 112 of the sheet-shaped member 110. The center part member 1381 and the side part member 1391 are fabricated by punching a sheet-shaped member having the same thickness as that of the sheet-shaped member 110 and a different color from that of the sheet-shaped member 110.

Alternatively, although the RFID 16 is inserted between a pair of sheet-shaped members 120 of the colored layer 12 in the aforementioned embodiment, the RFID 16 may be arranged in any place as long as it is embedded in the game token money 10. For example, the RFID 16 may be arranged between the pale color layer 11 and the colored layer 12. In this case, the colored layer 12 may include a single sheet-shaped member 120. In addition, the number of the layers of the game token money 10 may be changed more than or less than that of the aforementioned embodiment.

Although the middle layer is the colored layer 12, and the surface layer is the pale color layer 11 in the aforementioned embodiment, inversely, the middle layer may be the pale color layer 11, and the surface layer may be the colored layer 12. In this case, the colored layer 12 has the notches where the classification parts 13 are filled. Alternatively, although the transparent protection layer is provided outside of the pale color layer 11 serving as the surface layer, and a layer serving as a front face of the game token money 10 in practice is the protection layer in the aforementioned embodiment, a layer having a surface visually recognizable from the front face side of the game token money 10 in this manner is referred to as the surface layer in this application because the (printing of the) front face of the pale color layer 11 can be visually recognized by observing the front face. The surface layer may also be the outermost layer.

Although the classification part member 131 is filled in the blank portion 112 of the sheet-shaped member 110, and another sheet-shaped member is then overlapped thereon in the aforementioned embodiment, instead, the classification part member 131 may be filled in the blank portion 112 after the sheet-shaped member 110 having the blank portion 112 is overlapped with another sheet-shaped member.

Although the classification part 13 is filled in both the front and back surface layers of the game token money 10 in the aforementioned embodiment, the classification part 13 may be filled in only one of the surface layers. In addition, although four classification parts are filled in one of the surface layers at an interval of 90° in the aforementioned embodiment, the number of classification parts 13 may be different from four. If two or more classification parts 13 are provided at an equiangular interval, it is possible to observe at least one of the classification parts 13 using the camera 52 regardless of an orientation of the circumferential direction of the game token money 10 when the game token money 10 is housed in the chip tray Tr by exposing more than a half as illustrated in FIG. 11. Therefore, it is desirable to provide two or more classification parts 13 in a single surface layer.

Although the identification information is given to the game token money 10 using the marks 14 and 15 or the RFID 16 in the aforementioned embodiment, the game token money 10 may be absent of the identification information.

Figure 20:
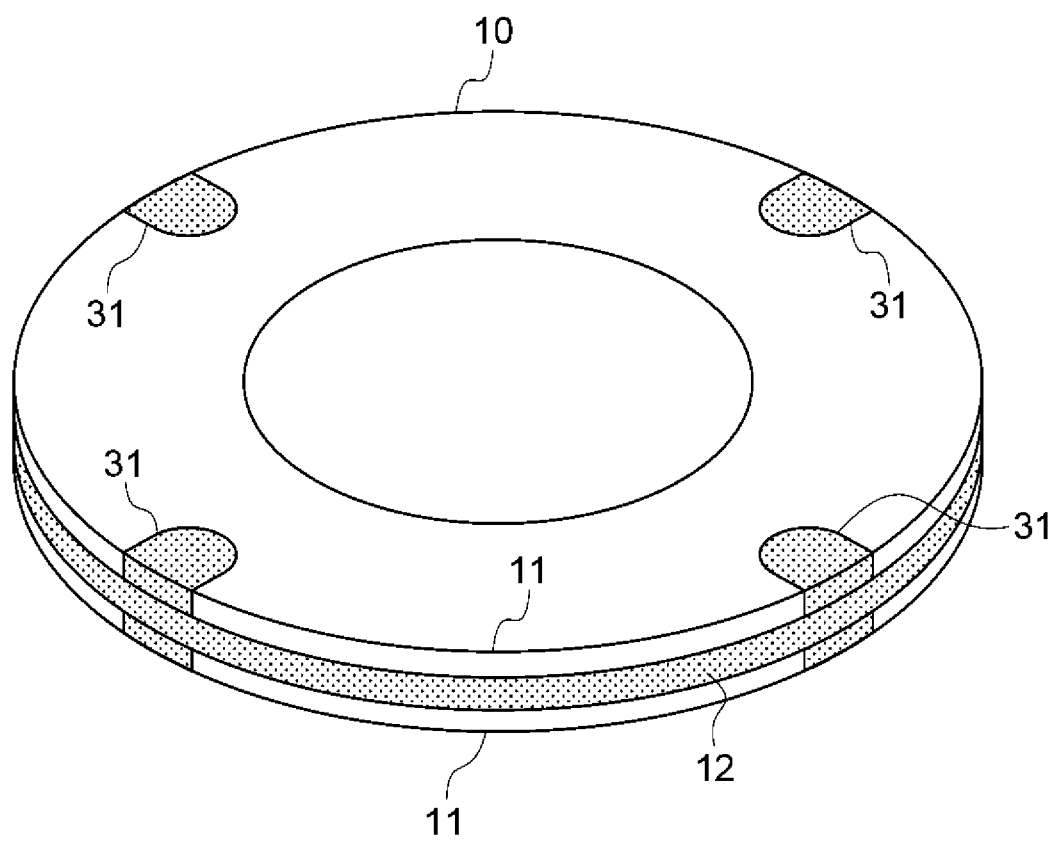
FIG. 20 is a perspective view illustrating a game token money filled with classification parts according to a modification.

Another modification of the classification part will now be described. FIG. 20 is a perspective view illustrating a game token money 10 filled with a classification part according to a modification. The classification part 31 has the same color as that of the colored layer 12. For this reason, the classification part 31 is formed of the same material as that of the colored layer 12. A plurality of classification parts 31 are arranged at an equiangular interval in the circumferential direction along the outer edge of the game token money 10. According to this modification, each classification part 31 has a relatively wide width, and four classification parts 31 are arranged at an angular interval of 90° in the circumferential direction.

Figure 21:
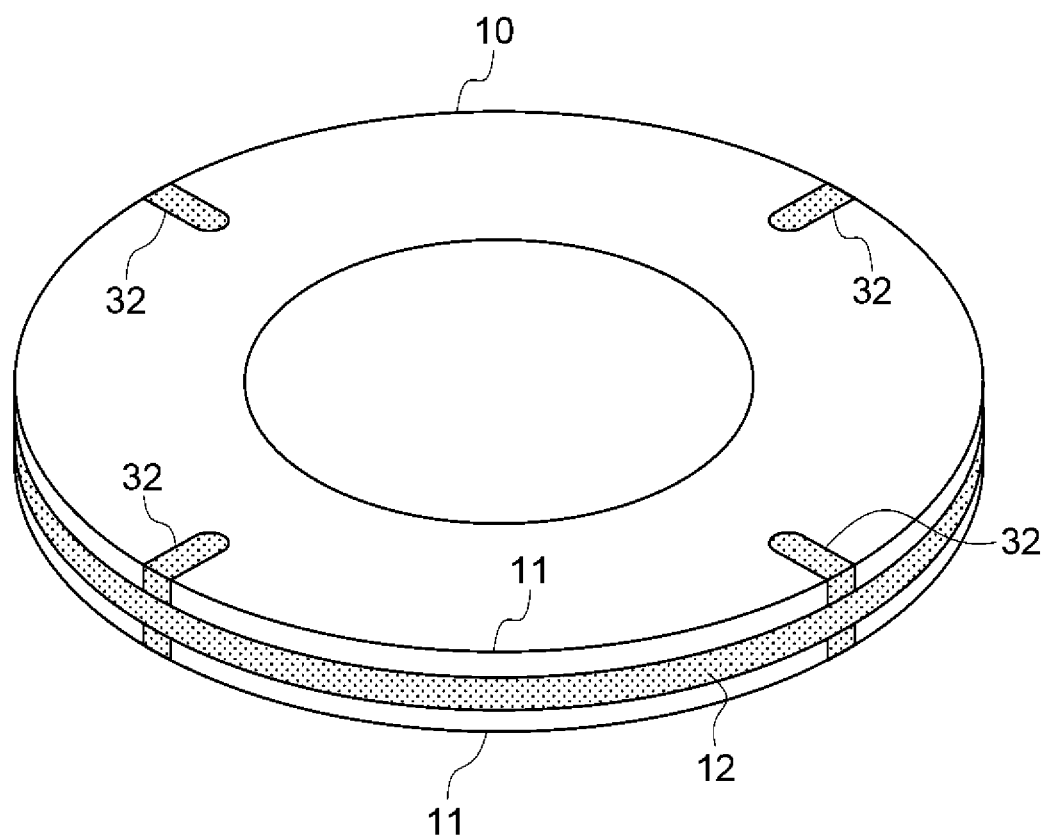
FIG. 21 is a perspective view illustrating a game token money filled with classification parts according to a modification.

FIG. 21 is a perspective view illustrating a game token money 10 filled with a classification part according to another modification. The classification part 32 has the same color as that of the colored layer 12. For this reason, the classification part 32 is formed of the same material as that of the colored layer 12. A plurality of classification parts 32 are arranged at an equiangular interval in the circumferential direction along the outer edge of the game token money 10. According to this modification, the classification part 31 has a relatively narrow width, and four classification parts 32 are arranged at an angular interval of 90° in the circumferential direction.

Figure 22:
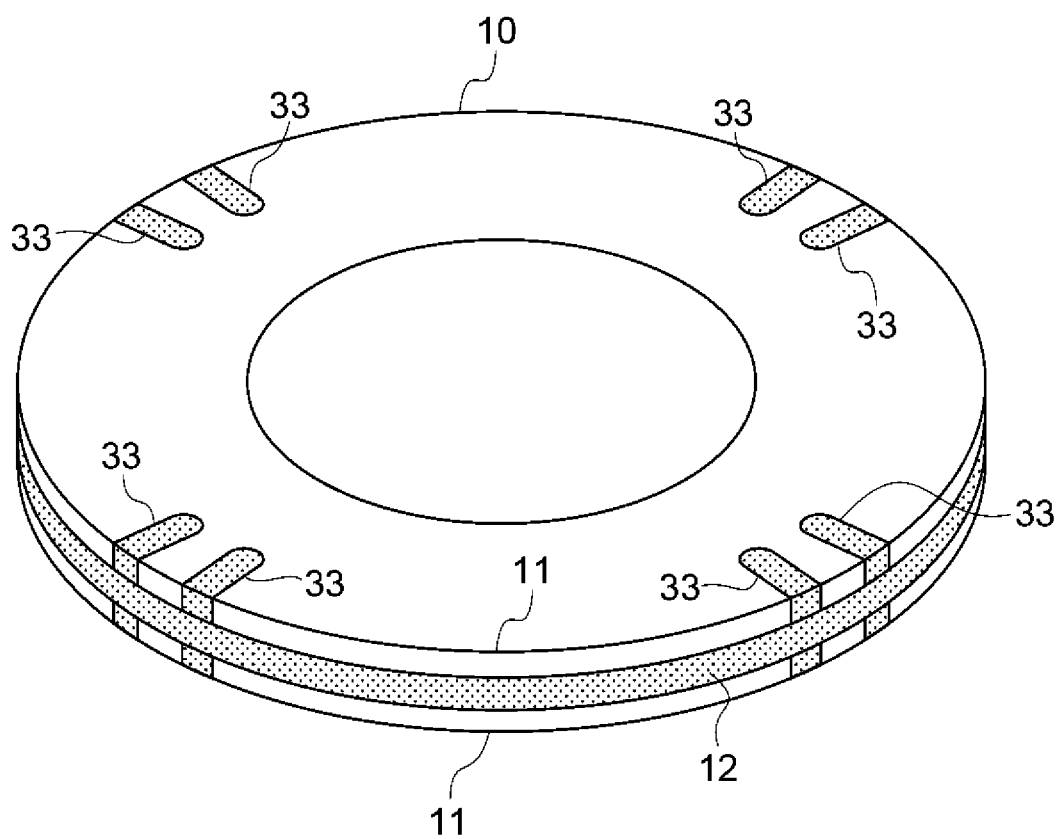
FIG. 22 is a perspective view illustrating a game token money filled with classification parts according to a modification.

FIG. 22 is a perspective view illustrating a game token money 10 filled with a classification part according to another modification. The classification part 33 has the same color as that of the colored layer 12. For this reason, the classification part 33 is formed of the same material as that of the colored layer 12. According to this modification, the classification part 33 has a relatively narrow width shape. In addition, according to this modification, a pair of classification parts 33 arranged at a relatively narrow interval in the circumferential direction constitute a single set, and a plurality of sets are arranged at an equiangular interval in the circumferential direction along the outer edge of the game token money 10. According to this modification, four sets of classification parts 33 are arranged at an angular interval of 90° in the circumferential direction.

Figure 23:
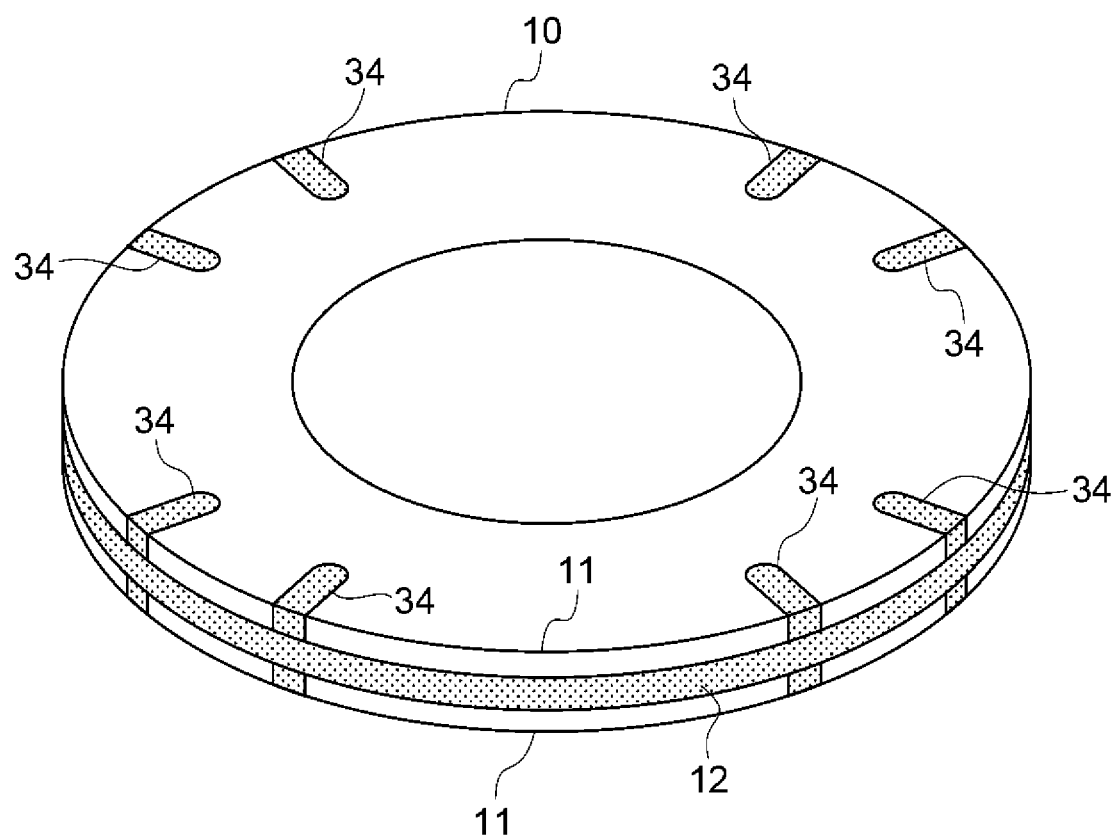
FIG. 23 is a perspective view illustrating a game token money filled with classification parts according to a modification.

FIG. 23 is a perspective view illustrating a game token money 10 filled with a classification part according to another modification. The classification part 34 has the same color as that of the colored layer 12. For this reason, the classification part 34 is formed of the same material as that of the colored layer 12. According to this modification, the classification part 34 has a relatively narrow width shape. In addition, according to this modification, a pair of classification parts 34 arranged at a relatively wide interval in the circumferential direction constitute a single set, and a plurality of sets are arranged at an equiangular interval in the circumferential direction along the outer edge of the game token money 10. According to this modification, four sets of classification parts 34 are arranged at an angular interval of 90° in the circumferential direction.

Figure 24:
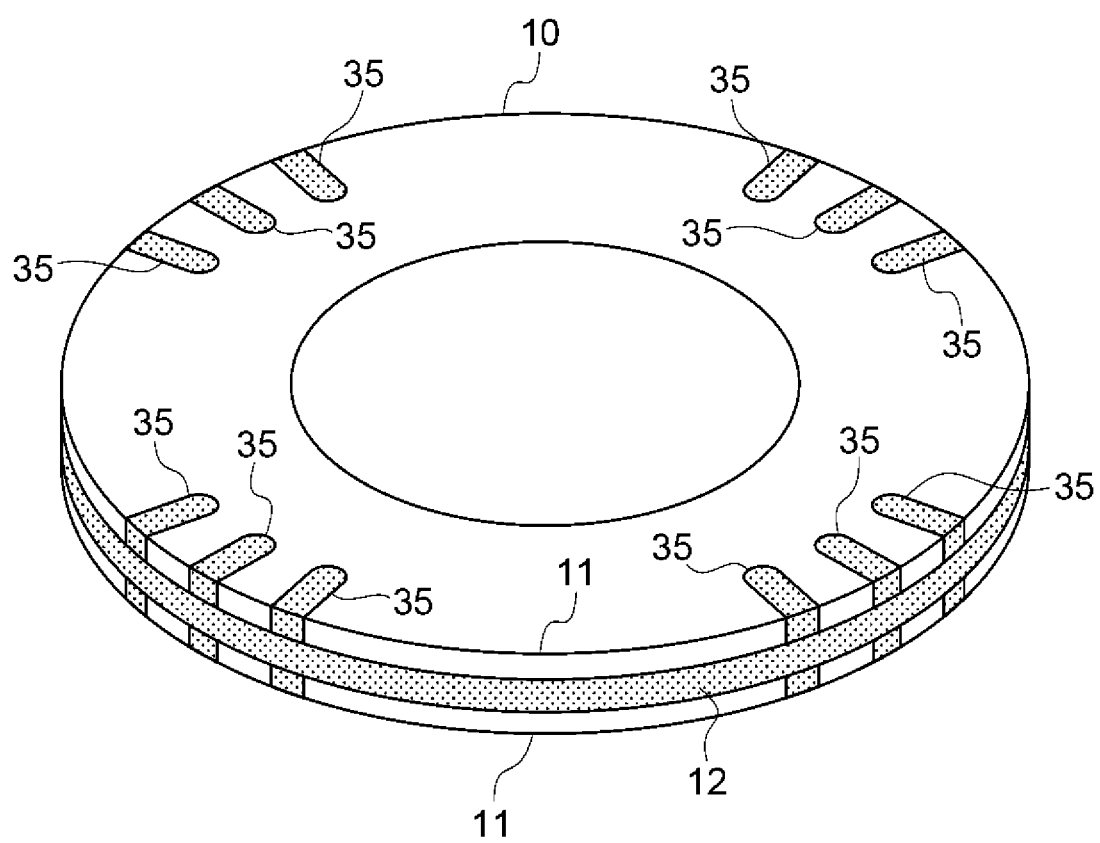
FIG. 24 is a perspective view illustrating a game token money filled with classification parts according to a modification.

FIG. 24 is a perspective view illustrating a game token money 10 filled with a classification part according to another modification. The classification part 35 has the same color as that of the colored layer 12. For this reason, the classification part 35 is formed of the same material as that of the colored layer 12. According to this modification, the classification part 35 has a relatively narrow width shape. In addition, according to this modification, three classification parts 35 arranged at a relatively narrow interval in the circumferential direction constitute a single set, and a plurality of sets are arranged at an equiangular interval in the circumferential direction along the outer edge of the game token money 10. According to this modification, four sets of classification parts 35 are arranged at an angular interval of 90° in the circumferential direction.

Figure 25:
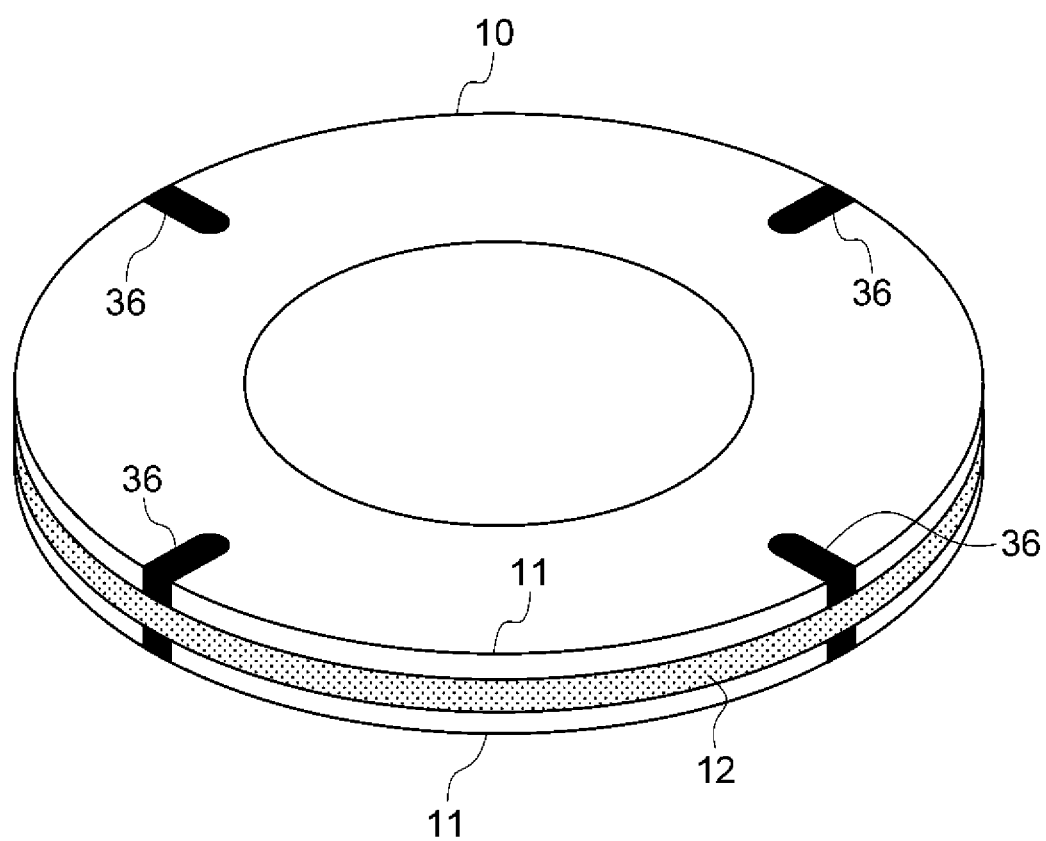
FIG. 25 is a perspective view illustrating a game token money filled with classification parts according to a modification.

FIG. 25 is a perspective view illustrating a game token money 10 filled with a classification part according to another modification. The classification part 36 has a color different from that of the colored layer 12. For this reason, the classification part 36 is formed of a material different from that of the colored layer 12. A plurality of classification parts 36 are arranged at an equiangular interval in the circumferential direction along the outer edge of the game token money 10. According to this modification, the classification parts 36 have a relatively narrow width shape. In addition, according to this modification, four classification parts 36 are arranged at an angular interval of 90° in the circumferential direction.

Figure 26:
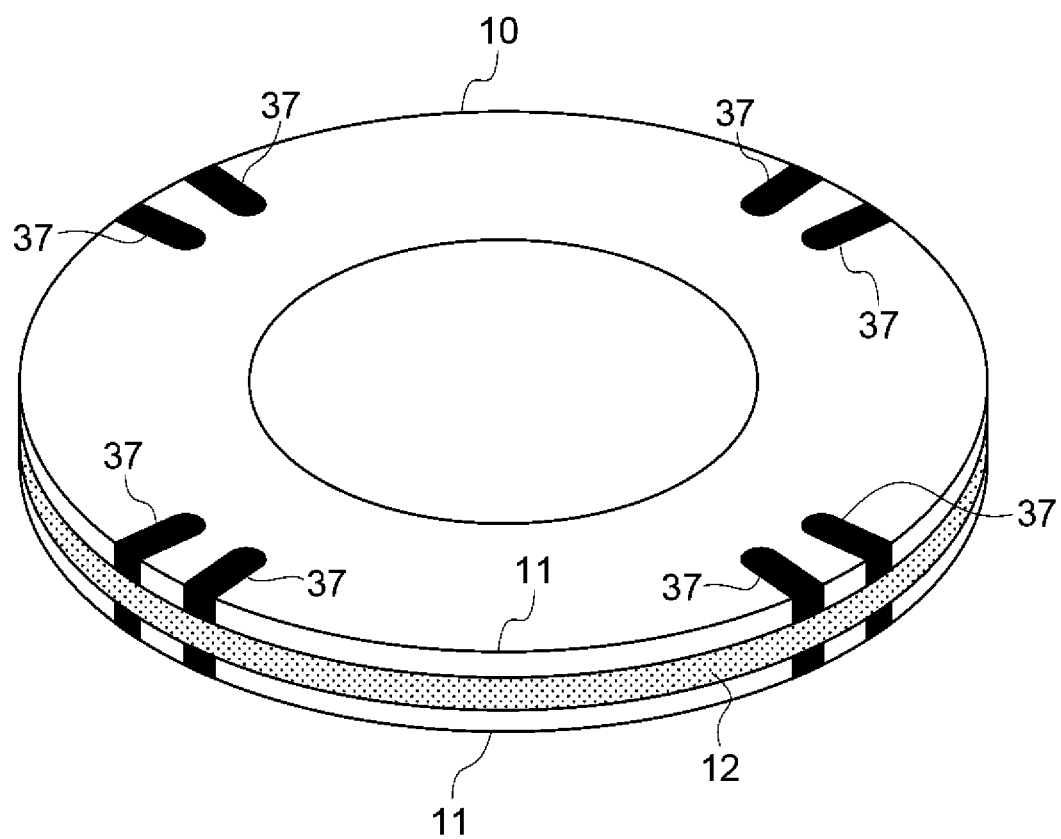
FIG. 26 is a perspective view illustrating a game token money filled with classification parts according to a modification.

FIG. 26 is a perspective view illustrating a game token money 10 filled with a classification part according to another modification. The classification part 37 has a color different from that of the colored layer 12. For this reason, the classification part 37 is formed of a material different from that of the colored layer 12. According to this modification, a pair of classification parts 37 arranged at a relatively narrow interval constitute a single set, and a plurality of sets are arranged at an equiangular interval in the circumferential direction along the outer edge of the game token money 10. According to this modification, four sets of classification parts 37 are arranged at an angular interval of 90° in the circumferential direction.

Figure 27:
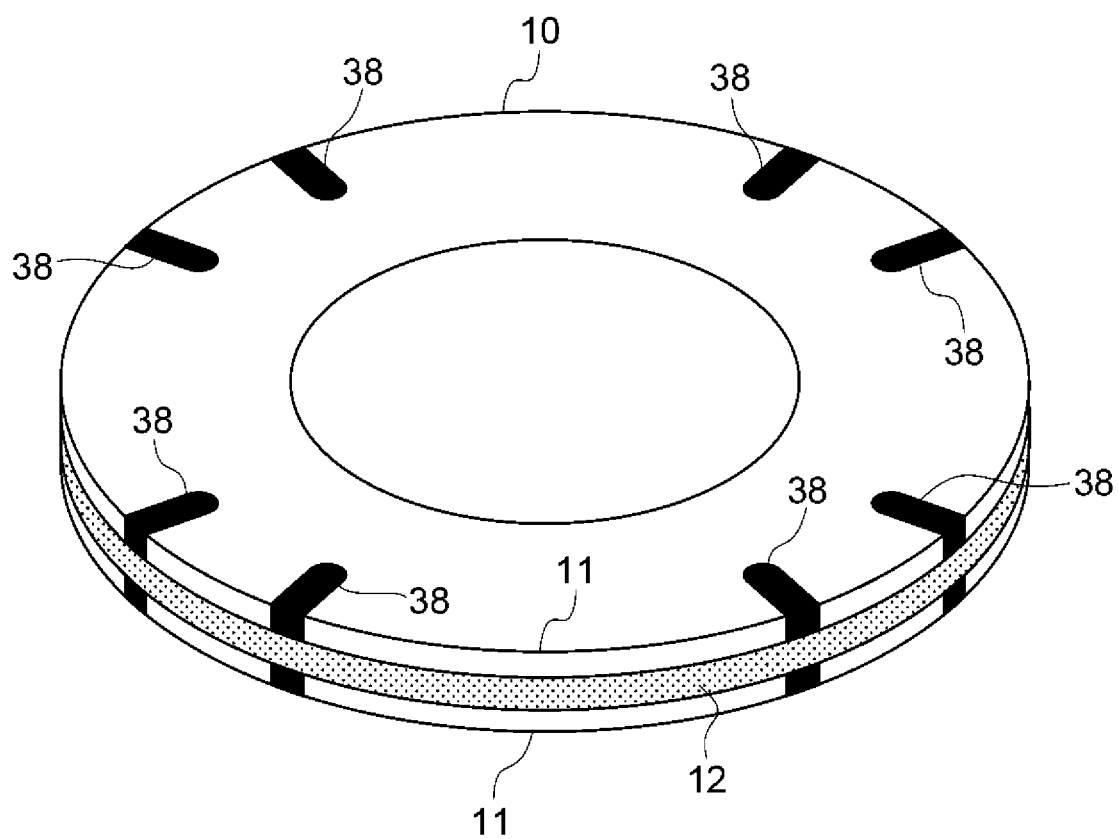
FIG. 27 is a perspective view illustrating a game token money filled with classification parts according to a modification.

FIG. 27 is a perspective view illustrating a game token money 10 filled with a classification part according to another modification. The classification part 38 has a color different from that of the colored layer 12. For this reason, the classification part 38 is formed of a material different from that of the colored layer 12. According to this modification, the classification part 38 has a relatively narrow width shape. In addition, according to this modification, a pair of classification parts 38 arranged at a relatively wide interval in the circumferential direction constitute a single set, and a plurality of sets are arranged at an equiangular interval in the circumferential direction along the outer edge of the game token money 10. According to this modification, four sets of classification parts 38 are arranged at an angular interval of 90° in the circumferential direction.

Figure 28:
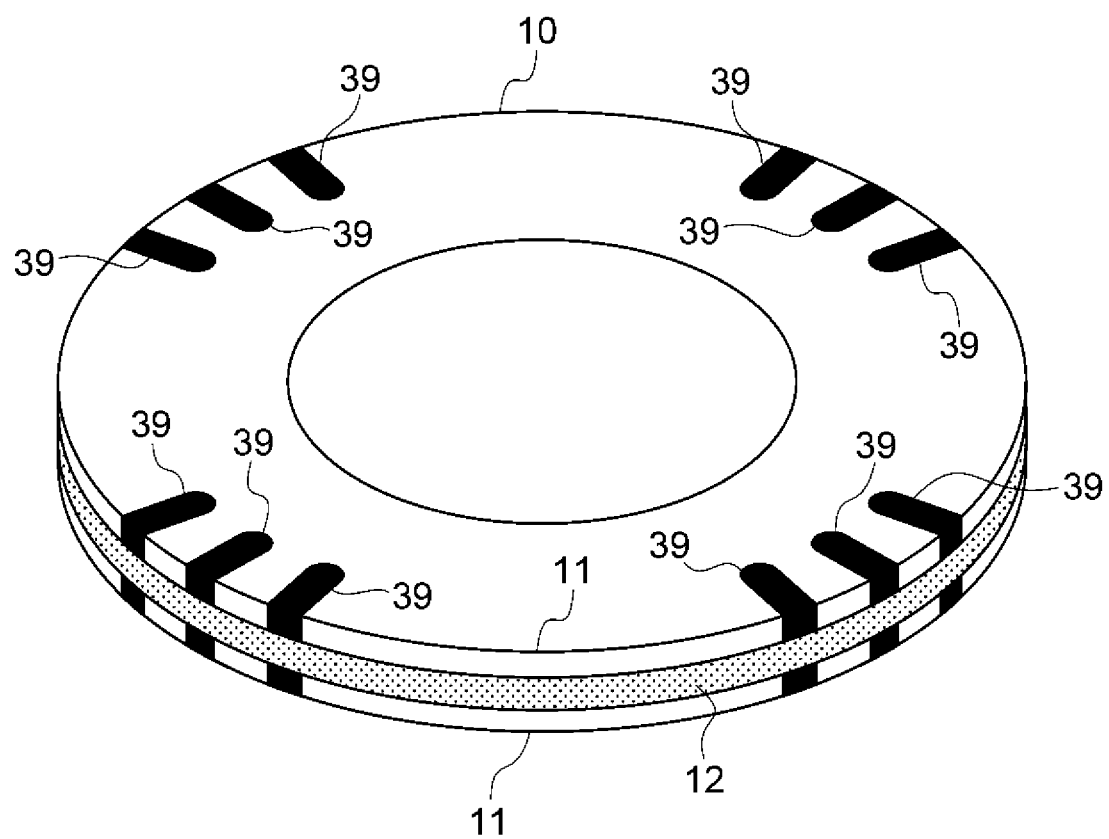
FIG. 28 is a perspective view illustrating a game token money filled with classification parts according to a modification.

FIG. 28 is a perspective view illustrating a game token money 10 filled with a classification part according to another modification. The classification part 39 has a color different from that of the colored layer 12. For this reason, the classification part 39 is formed of a material different from that of the colored layer 12. According to this modification, the classification part 39 has a relatively narrow width shape. In addition, according to this modification, three classification parts 39 arranged at a relatively narrow interval in the circumferential direction constitute a single set, and a plurality of sets are arranged at an equiangular interval in the circumferential direction along the outer edge of the game token money 10. According to this modification, four sets of classification parts 39 are arranged at an angular interval of 90° in the circumferential direction.

Figure 29:
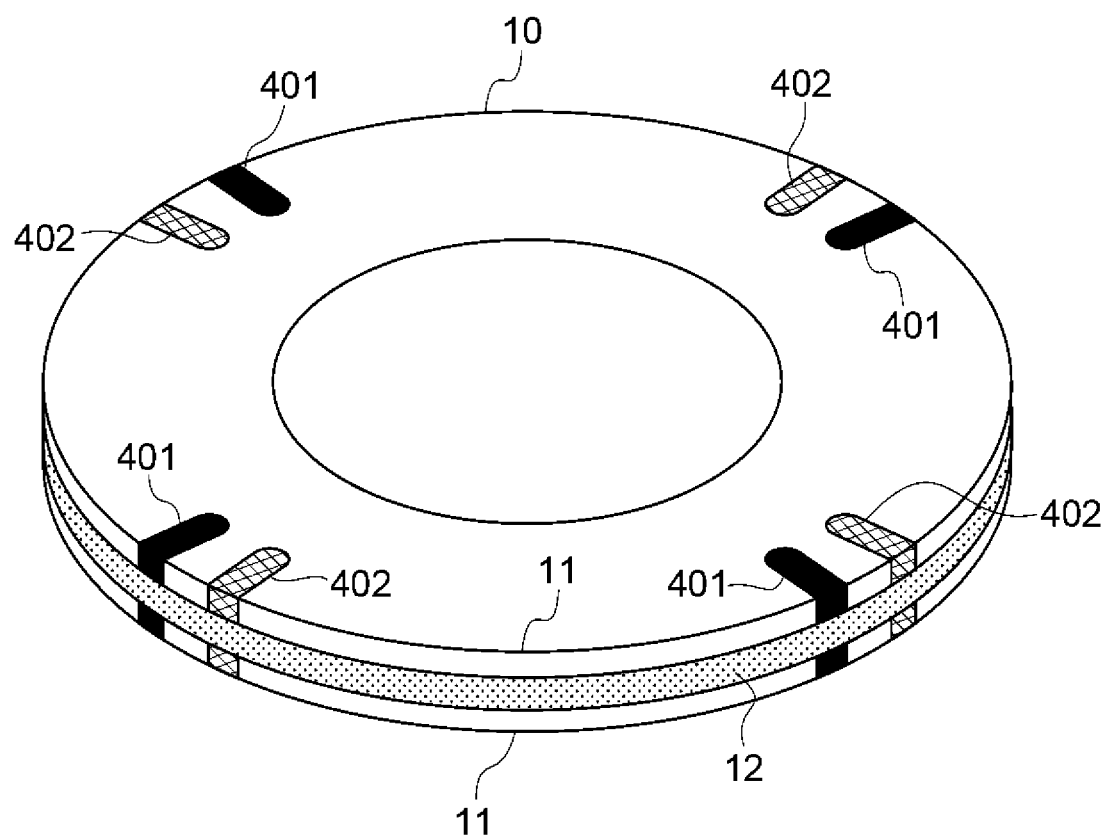
FIG. 29 is a perspective view illustrating a game token money filled with classification parts according to a modification.

FIG. 29 is a perspective view illustrating a game token money 10 filled with a classification part according to another modification. According to this modification, two types of classification parts 401 and 402 having different colors constitute a single set, and a plurality of sets are arranged at an equiangular interval in the circumferential direction along the outer edge of the game token money 10. According to this modification, four sets of classification parts 401 and 402 are arranged at an angular interval of 90° in the circumferential direction. The classification parts 401 and 402 have different colors, and each color of the classification parts 401 and 402 is different from the color of the colored layer 12. Each classification part has a relatively narrow width shape.

Figure 30:
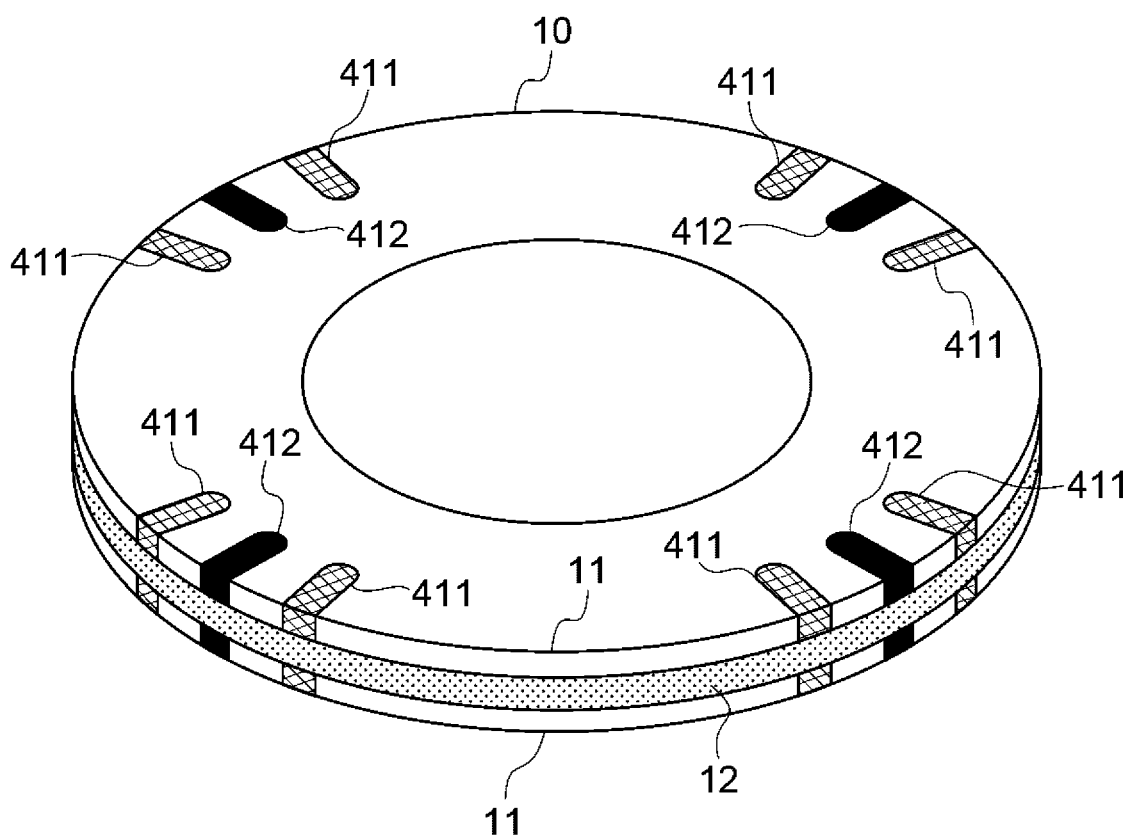
FIG. 30 is a perspective view illustrating a game token money filled with classification parts according to a modification.

FIG. 30 is a perspective view illustrating a game token money 10 filled with a classification part according to another modification. According to this modification, two types of classification parts 411 and 412 having different colors constitute a single set, and a plurality of sets are arranged at an equiangular interval in the circumferential direction along the outer edge of the game token money 10. According to this modification, a pair of classification parts 411 and a single classification part 412 constitute a single set. According to this modification, four sets of classification parts 411 and 412 are arranged at an angular interval of 90° in the circumferential direction. The classification parts 411 and 412 have different colors, and each color of the classification parts 411 and 412 is different from the color of the colored layer 12. Each classification part has a relatively narrow width shape.

In the examples of FIGS. 20 to 30, the numerals 17 in the center for indicating the value information, and the marks 14 and 15 for indicating the identification information are not illustrated for simplicity purposes. However, any information equal to or different from the information of the aforementioned embodiment may also be inserted into the game token moneys of each modification.

Next, a use of the game token money 10 filled with the classification part will be described. As described above, the classification part indicates the classification information. The classification information may include, for example, any one of information for distinguishing whether the game token money 10 is a rolling chip or a cash chip, junket information differently set for each junket to specify a junket, and casino information differently set for each casino to specify the casino.

The game token money 10 is roughly classified into VIP chips and typical common chips. Note that the VIP chips are game token money available for VIP players. For example, a player who deposits money equal to or more than a predetermined amount in a casino becomes the VIP player.

Each of the VIP chips and the common chips can be classified into cash chips, rolling chips, promotion chips, and the like. The cash chips are game token money that can be exchanged with cash. The rolling chips are game token money that can be used to obtain cap chips by participating and winning in a game. In addition, the promotion chips are game token money distributed for promotion.

Here, the rolling chip will be further described. The "rolling" refers to an action for exchanging the cash chip with the rolling chip. The rolling chip can be bought by only a player who deposits a predetermined amount of money in a casino and opens a rolling program. When a player participates and wins in a game using the rolling chips, withdrawal is made on the basis of cash chips. A player can exchange cash chips (or cash) with rolling chips, and a predetermined percentage of a total rolling money amount is paid to a player as a commission whenever the rolling. Therefore, if the rolling money amount increases, the player can get the more commission depending on the rolling money. In this manner, an action of continuously exchanging (rolling) the rolling chips and the cash chips is referred to as "rolling". The commission generated in the rolling is input to a system and is managed by the system.

Next, the junket chip will be further described. The game token money used by the junket has a mark dedicated to each junket. It would be difficult to distinguish a plurality of junkets just by using the shape and the arrangement of the classification part. In this case, similar to the examples of FIGS. 17, 29, and 30, it is advantageous to provide classification information for distinguishing the junket in combination with a plurality of colors.

What is claimed is:

1. A game token money comprising:
a plurality of plastic layers laminated through thermocompression bonding, the plurality of plastic layers including a colored layer and a pale color layer laminated on the colored layer, so that a stripe pattern is formed in a layering direction on a side face of the game token money; and
a plurality of classification parts positioned within a part of the pale color layer;
wherein:
each classification part of the plurality of classification parts indicates a classification of the game token money and are recognizable from both a side face and a flat surface of the game token money; and
at least a portion of the colored layer extends circumferentially about an entirety of the side face of the game token money without interruption by the plurality of classification parts.

2. The game token money according to claim 1, wherein each of the plurality of classification parts has a color different from a color of the colored layer.

3. The game token money according to claim 1, wherein each of the plurality of classification parts has a color similar to a color of the colored layer.

4. The game token money according to claim 1, wherein each of the plurality of classification parts has a plurality of different colors.

5. The game token money according to claim 1, wherein each of the plurality of classification parts indicates a classification of the game token money regarding whether the game token money is for a very important person (VIP) or for a common person.

6. The game token money according to claim 1, wherein each of the plurality of classification parts indicates a classification of the game token money regarding whether the game token money is for a cash chip, for a rolling chip, or for a promotion chip.

7. The game token money according to claim 1, wherein the plurality of classification parts are arranged at an equiangular interval in a circumferential direction of the game token money.

8. The game token money according to claim 1, further comprising a radio-frequency identification (RFID) embedded in a layer other than an outermost layer of the plurality of plastic layers.

9. The game token money according to claim 8, wherein the RFID contains information regarding the value and the classification of the game token money.

10. A game token money comprising:
an indication for indicating a value of the game token money on a front face of the game token money;
a colored layer forming a stripe of a stripe pattern in a layering direction on a side face of the game token money; and
a plurality of classification parts that at least partly occupy, and are recognizable from, both the side face and a flat surface of the game token money;
wherein:
at least a portion of the colored layer extends circumferentially about an entirety of the side face of the game token money without interruption by the plurality of classification parts;
each of the plurality of classification parts is formed in a color different from a color of the colored layer; and
the classification parts indicate a classification, other than the value, of the game token money.

11. The game token money according to claim 10, further comprising an RFID that contains information regarding the value of the game token money and the classification of the game token money indicated by the classification parts.

12. The game token money according to claim 11, wherein the colored layer and the classification parts are externally recognized by a camera, and wherein the value and the classification of the game token money obtained from the camera can be inspected in combination with information obtained from the RFID.

13. The game token money according to claim 10, wherein the classification parts are arranged at an equiangular interval in a circumferential direction of the game token money.

* * * * *